(12) United States Patent
Das et al.

(10) Patent No.: US 9,244,975 B2
(45) Date of Patent: Jan. 26, 2016

(54) JUST-IN-TIME ANALYTICS ON LARGE FILE SYSTEMS

(75) Inventors: Gautam Das, Irving, TX (US); Hao H. Huang, McLean, VA (US); Sandor Szalay, Baltimore, MD (US); Nan Zhang, Fairfax, VA (US)

(73) Assignees: The George Washington University, Washington, DC (US); Board of Regents, The University of Texas System, Austin, TX (US); The Johns Hopkins University, Baltimore, MD (US)

( * ) Notice: Subject to any disclaimer, the term of this patent is extended or adjusted under 35 U.S.C. 154(b) by 0 days.

(21) Appl. No.: 13/328,810

(22) Filed: Dec. 16, 2011

(65) Prior Publication Data

US 2012/0166478 A1 Jun. 28, 2012

Related U.S. Application Data

(60) Provisional application No. 61/423,939, filed on Dec. 16, 2010.

(51) Int. Cl.
*G06F 17/30* (2006.01)
(52) U.S. Cl.
CPC .............................. *G06F 17/30442* (2013.01)
(58) Field of Classification Search
CPC .................... G06F 17/30115; G06F 17/30442
USPC .............. 707/769, 999.001, 999.2, 828, 713, 707/786, 758
See application file for complete search history.

(56) References Cited

U.S. PATENT DOCUMENTS

| | | | |
|---|---|---|---|
| 5,379,422 A * | 1/1995 | Antoshenkov | 1/1 |
| 6,947,934 B1 * | 9/2005 | Chen et al. | 1/1 |
| 7,136,851 B2 | 11/2006 | Ma et al. | |
| 7,185,011 B1 * | 2/2007 | Dujari | 1/1 |
| 7,730,060 B2 * | 6/2010 | Chakrabarti et al. | 707/723 |
| 7,761,528 B2 * | 7/2010 | Shen et al. | 709/208 |
| 7,801,913 B2 | 9/2010 | Shrivastava et al. | |

(Continued)

OTHER PUBLICATIONS

N. Agrawal et al., "Generating Realistic Impressions for File-System Benchmarking," ACM Transactions on Storage (TOS), 2009, pp. 1-14.

(Continued)

*Primary Examiner* — Miranda Le
(74) *Attorney, Agent, or Firm* — Blank Rome LLP

(57) ABSTRACT

As file systems reach the petabytes scale, users and administrators are increasingly interested in acquiring high-level analytical information for file management and analysis. Two particularly important tasks are the processing of aggregate and top-k queries which, unfortunately, cannot be quickly answered by hierarchical file systems such as ext3 and NTFS. Existing pre-processing based solutions, e.g., file system crawling and index building, consume a significant amount of time and space (for generating and maintaining the indexes) which in many cases cannot be justified by the infrequent usage of such solutions. User interests can often be sufficiently satisfied by approximate (i.e., statistically accurate) answers. A just-in-time sampling-based system can, after consuming a small number of disk accesses, produce extremely accurate answers for a broad class of aggregate and top-k queries over a file system without the requirement of any prior knowledge. The system is efficient, accurate and scalable.

22 Claims, 10 Drawing Sheets

(56) References Cited

U.S. PATENT DOCUMENTS

| | | | |
|---|---|---|---|
| 7,890,491 B1 | 2/2011 | Simmen | |
| 7,921,106 B2* | 4/2011 | Chen et al. | 707/723 |
| 7,990,982 B2* | 8/2011 | Duffield et al. | 370/400 |
| 8,041,893 B1* | 10/2011 | Fung et al. | 711/118 |
| 8,094,585 B2* | 1/2012 | Liang et al. | 370/256 |
| 8,234,297 B2 | 7/2012 | He | |
| 8,285,760 B1* | 10/2012 | Sina | 707/824 |
| 8,332,394 B2* | 12/2012 | Fan et al. | 707/723 |
| 8,346,791 B1* | 1/2013 | Shukla et al. | 707/759 |
| 8,607,057 B2* | 12/2013 | Nath | 713/180 |
| 8,825,640 B2* | 9/2014 | Cormode et al. | 707/723 |
| 2002/0032696 A1* | 3/2002 | Takiguchi et al. | 707/500.1 |
| 2004/0111410 A1 | 6/2004 | Burgoon et al. | |
| 2004/0193594 A1* | 9/2004 | Moore et al. | 707/4 |
| 2004/0249810 A1 | 12/2004 | Das et al. | |
| 2004/0267793 A1* | 12/2004 | Sato | 707/100 |
| 2005/0050016 A1* | 3/2005 | Stanoi et al. | 707/3 |
| 2005/0143059 A1* | 6/2005 | Imura | 455/419 |
| 2006/0184572 A1* | 8/2006 | Meek et al. | 707/103 X |
| 2006/0200465 A1* | 9/2006 | Chuang | 707/6 |
| 2006/0212429 A1* | 9/2006 | Bruno et al. | 707/3 |
| 2006/0218122 A1* | 9/2006 | Poston et al. | 707/1 |
| 2007/0226265 A1* | 9/2007 | Nichols et al. | 707/200 |
| 2007/0260613 A1* | 11/2007 | Ippili et al. | 707/100 |
| 2008/0109428 A1* | 5/2008 | Suciu et al. | 707/5 |
| 2008/0133496 A1* | 6/2008 | Kanungo et al. | 707/5 |
| 2008/0195577 A1 | 8/2008 | Fan et al. | |
| 2009/0063570 A1* | 3/2009 | Nichols et al. | 707/200 |
| 2009/0240682 A1* | 9/2009 | Balmin et al. | 707/5 |
| 2010/0077147 A1* | 3/2010 | Liu | 711/126 |
| 2010/0132022 A1* | 5/2010 | Venkatasubramanian | 726/7 |
| 2010/0142794 A1* | 6/2010 | Gardi et al. | 382/133 |
| 2010/0169360 A1* | 7/2010 | Cohen et al. | 707/769 |
| 2010/0287512 A1* | 11/2010 | Gan et al. | 715/854 |
| 2010/0290617 A1* | 11/2010 | Nath | 380/29 |
| 2010/0332520 A1* | 12/2010 | Lu et al. | 707/769 |
| 2011/0213801 A1* | 9/2011 | He | 707/770 |
| 2012/0130960 A1 | 5/2012 | Nerger | |
| 2012/0137081 A1* | 5/2012 | Shea | 711/145 |
| 2012/0197868 A1 | 8/2012 | Fauser et al. | |

OTHER PUBLICATIONS

N. Agrawal et al., "A Five-Year Study of File-System Metadata," Proceedings of the 5th USENIX Conference on File and Storage Technologies, 2007, pp. 1-15.

S. Ames et al., "Design and Implementation of a Metadata-Rich File System," Tech. Rep. UCSC-SOE-10-07, Univ. of California, Santa Cruz and Lawrence Livermore National Laboratory, 2010, pp. 1-14.

D. Barbara et al., "The New Jerey Data Reduction Report," IEEE, 1997, pp. 1-43.

M. Kozak, "Survey Sampling: On Sample Allocation in Multivariate Surveys," 2006, Communications in Statistics—Simulation and Computation, 35:4, pp. 901-910.

S. Brandt et al., "Fusing Data management Services with File System," Proceedings of the 4th Annual Workshop on Petascale Data Storage (PDSW '09), New York, NY, USA, Nov. 15, 2009, ACM, pp. 1-5.

J. Callan, "Query-Based Sampling of Text Databases," ACM Transactions on Information Systems, Apr. 2001, pp. 97-130, vol. 19, No. 2.

B. D. Causey, "Computational Aspects of Optimal Allocation in Multivariate Stratified Sampling," Society for Industrial and Applied Mathematics, J. Sci. Stat. Comput., Jun. 1983, vol. 4, No. 2, pp. 322-329.

S. Chaudhuri et al., "Optimized Stratified Sampling for Approximate Query Processing," ACM Transactions on Database Systems, Jun. 2007, vol. 32, No. 2, Article 9, pp. 1-50.

S. Chaudhuri et al., "Effective Use of Block-Level Sampling in Statistics Estimation," Microsoft Research, Jun. 2004, 12 pages.

J. R. Chromy, "Design Optimization with Multiple Objectives," Proceedings on the Research Methods of the American Statistical Association,1987, pp. 194-199.

D. McCullagh, "Security Guide to Customs—Proofing Your Laptop," Politics and Law—CNET New, Mar. 2008, 5 pages, www.news.cnet.com/8301-13578_3-9892897-38.html.

G. Das, "Survey of Approximate Query Processing Techniques," International Conference on Scientific and Statistical Database Management (SSDBM '03), 2003, 16 pages.

A. Dasgupta et al., "A Random Walk Approach to Sampling Hidden Databases," Proceedings of the 2007 ACM SIGMOD international conference on Management of data (SIGMOD '07), Jun. 2007, pp. 629-640.

A. Dasgupta et al., Unbiased Estimation of Size and Other Aggregates Over Hidden Web Databases, Proceedings of the 2010 international conference on Management of data (SIGMOD), Jun. 2010, pp. 855-866.

A. Dasgupta et al., Leveraging COUNT Information in Sampling Hidden Databases, Proceedings of the 2009 IEEE International Conference on Data Engineering, 2009, 12 pages.

A. Dasgupta et al., "Privacy Preservation of Aggregates in Hidden Databases: Why and How?," Proceedings of the 35th SIGMOD international conference on Management of data, Jun. 29-Jul. 2, 2009, pp. 153-164.

D. Ellard et al., "Passive NFS Tracing of Email and Research Workloads," Proceedings of the 2nd USENIX Conference on File and Storage Technologies (FAST '03), Berkeley, CA, USENIX Association, 2003, 14 pages.

M. Garofalakis et al., "Approximate Query Processing: Taming the Terabytes!," Information Sciences Research Center, Bell Laboratories, Proceedings of the 27th International Conference on Very Large Data Bases (VLDB), 2001, pp. 169-212.

Y. L. Hedley et al., A Two-Phase Sampling Technique for Information Extraction from Hidden Web Databases, Proceedings of the 6th annual ACM international workshop on Web information and data management (WIDM '04), Nov. 2004, pp. 1-8.

Y. L. Hedley et al., "Sampling, Information Extraction and Summarisation of Hidden Web Databases," Data and Knowledge Engineering, 2006, 33 pages.

Y. Hua et al., "SmartStore: A New Metadata Organizationi Paradigm with Metadata Semantic-Awareness for Next Generation File Systems," CSE Techinical Reports, 2008, paper 65, 12 pages, http://digitalcommons.unl.edu/csetechreports/65.

H. H. Huang et al., "Just-in-Time Analytics on Large File Systems," Proceedings of the 9th USENIX conference on File and storage technologies, USENIX Association, 2011, pp. 1-14.

L. Huston et al., Diamond: A Storage Architecture for Early Discard in Interactive Search, Proceeding of the 3$^{rd}$ USENIX Conference on File and Storage Techonologies, San Francisco, CA, Mar. 2004, 14 pages.

I. F. Ilyas et al., "A Survey of Top-k Query Processing Techniques in Relational Database Systems," University of Waterloo, ACM Computing Surveys, Oct. 2008, vol. 40, No. 4, article 11, 59 pages, http://doi.acm.org/10.1145/1391729.1391730.

P. G. Ipeirotis et al., "Distributed Search over the Hidden Web: Hierarchical Database Sampling and Selection," Colubmia University, Proceedings of the 28$^{th}$ VLDB Conference, Hong Kong, China, 2002, 12 pages, http://www.cancer.gov/search/cancer_literature/.

P. Kogge et al., "ExaScale Computing Study: Technology Challenges in Achieving ExaScale Systems," DARPA Information Processing Techniques Office, Sep. 28, 2008, 297 pages.

A. W. Leung, "Organizing, Indexing, and Searching Large-Scale File Systems," Storage Systems Research Center, Baskin School of Engineering, and Univ. of California, Techinical Report UCSC-SSRC-09-09, Dec. 2009, 207 pages.

A. W. Leung et al., "Magellan: A Searchable Metadata Architecture for Large-Scale File Systems," Storage Systems Research Center, Baskin School of Engineering, and Univ. of California, Techinical Report UCSC-SSRC-09-07, Nov. 2009, 13 pages.

A. W. Leung et al., "Spyglass: Fast, Scalable Metadata Search for Large-Scale Storage Systems," USENIX Association, 7th USENIX Conference on File and Storage Technologies, 2009, pp. 153-166.

M. Lillibridge et al., "Sparse Indexing: Large Scale, Inline Deduplication Using Sampling and Locality," USENIX Association, 7th USENIX Conference on File and Storage Technologies, 2009, pp. 111-123.

(56) References Cited

OTHER PUBLICATIONS

L. Liu et al., "SmartScan: Efficient Metadata Crawl for Storage Management Metadata Querying in Large File Systems," Parallel Data Laboratory, Oct. 2010, pp. 1-17.
S. L. Lohr, "Sampling: Design and Analysis," Arizona State University, An International Thomson Publishing Co., Pacific Grove, 1999, pp. 1-494.
N. Murphy et al., "The Design and Implementation of the Database File System," Jan. 11, 2002, pp. 1-12.
J. Nunez et al., High End Computing File System and I/O R&D Gaps Roadmap, Los Alamos National Laboratory, LA-UR-08-2876, Aug. 2008, 14 pages.
F. Olken et al., Simple Random Sampling from Relational Databases, Computer Science Research Dept., Proceedings of the Twelfth International Conference on Very Large Data Bases, Aug. 1986, pp. 160-169.
F. Olken et al., "Random Sampling from Database Files: A Survey," Computer Science Research Dept., Proceedings of the fifth international conference on Statistical and scientific database management,1990, pp. 92-111.
M. A. Olson et al., "The Design and Implementation of the Inversion File System," Univ. of California at Berkeley, 1993 Winter USENIX, Jan. 25-29, 1993, pp. 1-14.
R. Pike et al., "Plan 9 from Bell Labs," Computing Systems, 1995, vol. 8, No. 3, 22 pages.
Plan 9 File System Traces, pdos.csail.mit.edu/p9trace/, Apr. 27, 2012, 1 page, ftp://www.cs.bell-labs.com/p9trace.
M. Seltzer et al., "Hierarchical File Systems are Dead," Proceedings of the 12th conference on Hot topics in Operating Systems (HotOS '09), Harvard School of Engineering and Applied Sciences, 2009, pp. 1-5.
"Laptops Can Be Searched At the Border—Slashdot," Apr. 27, 2012, pp. 1-33, yro.slashdot.org/story/08/04/22/1733251/laptops-can-be-searched-at-the-border.
P. Stahlberg et al., "Threats to Privacy in the Forensic Analysis of Database Systems," Proceedings of the 2007 ACM SIGMOD international conference on Management of data (SIGMOD '07), New York, NY, ACM, Jun. 12-14, 2007, pp. 91-102.
A. Szalay, "New Challenges in Petascale Scientific Databases (Keynote Talk)," Proceedings of the 20th international conference on Scientific and Statistical Database Management (SSDBM '08), Speinger-Verlag, Berlin, Heidelberg, 2008, 1 page.
J. S. Vitter, "Random Sampling with a Reservoir," ACM Transactions on Mathematical Software, Mar. 1985, vol. 11, No. 1, pp. 37-57.
Y. Zhu et al., "HBA: Distributed Metadata Management for Large Cluster-Based Storage Systems," CSE Journal Articles, IEEE Transactions on Parallel and Distributed Systems, 2008, pp. 750-763.
SNIA NSF traces, "I/O Trace Data Files," http://iotta.snia.org/traces, 2012, 2 pages.
"Google Desktop Update," Sep. 2011, 5 pages, http://googledesktop.blogspot.com.
"Beagle (Software)," http://en.wikipedia.org/wiki/Beagle_(software), available for download at https://launchpad.net/beagle, Jan. 2009, 2 pages.
K. C.-C. Chang et al., "Structured Databases on the Web: Observations and Implications," Sep. 2004, SIGMOD Record, vol. 33, No. 3, pp. 61-70.
P. Wu et al., "Query Selection Techniques for Efficient Crawling of Structured Web Sources," 2006, IEEE ICDE '06, 10 pages.
A. Broder et al, "Estimating Corpus Size via Queries," Nov. 2006, ACM CIKM '06, pp. 594-603.
Office Action dated Jun. 3, 2014, U.S. Appl. No. 13/402,764.

\* cited by examiner

JUST-IN-TIME ANALYTICS ON LARGE FILE SYSTEMS

RELATED APPLICATIONS

This application claims the benefit of U.S. Provisional Application No. 61/423,939, filed Dec. 16, 2010, the entire contents of which are incorporated herein by reference.

GOVERNMENT RIGHTS

This invention was made with Government support under Grant Nos. OCI-0937875, OCI-0937947, IIS-0845644, CCF-0852674, CNS-0852673, and CNS-0915834 awarded by the National Science Foundation. The Government has certain rights in this invention.

FIELD OF THE INVENTION

The present invention relates to a system that provides high-level analytical information for file management and analysis. More particularly, the present invention relates to a system which provides just-in-time analytics for large file systems.

BACKGROUND OF THE INVENTION

Today a file system with billions of files, millions of directories and petabytes of storage is no longer an exception [32]. As file systems grow, users and administrators are increasingly keen to perform complex queries [40], [50], such as "How many files have been updated since ten days ago?", and "Which are the top five largest files that belong to John?". The first is an example of aggregate queries which provide a high-level summary of all or part of the file system, while the second is top-k queries which locate the k files and/or directories that have the highest score according to a scoring function. Fast processing of aggregate and top-k queries are often needed by applications that require just-in-time analytics over large file systems, such as data management, archiving, etc. The just-in-time requirement is defined by two properties: (1) file-system analytics must be completed with a small access cost—i.e., after accessing only a small percentage of directories/files in the system (in order to ensure efficiency), and (2) the analyzer holds no prior knowledge (e.g., pre-processing results) of the file system being analyzed. For example, in order for a librarian to determine how to build an image archive from an external storage media (e.g., a Blue-ray disc), he/she may have to first estimate the total size of picture files stored on the external media—the librarian needs to complete data analytics quickly, over an alien file system that has never been seen before.

Unfortunately, hierarchical file systems (e.g., ext3 and NTFS) are not well equipped for the task of just-in-time analytics [46]. The deficiency is in general due to the lack of a global view (i.e., high-level statistics) of metadata information (e.g., size, creation, access and modification time). For efficiency concerns, a hierarchical file system is usually designed to limit the update of metadata information to individual files and/or the immediately preceding directories, leading to localized views. For example, while the last modification time of an individual file is easily retrievable, the last modification time of files that belong to user John is difficult to obtain because such metadata information is not available at the global level.

Currently, there are two approaches for generating high-level statistics from a hierarchical file system, and thereby answering aggregate and top-k queries: (1) The first approach is to scan the file system upon the arrival of each query, e.g., the find command in Linux, which is inefficient for large file systems. While storage capacity increases at approximately 60% per year, storage throughput and latency have much slower improvements. Thus the amount of time required to scan an off-the-shelf hard drive or external storage media has increased significantly over time to become infeasible for just-in-time analytics. The above-mentioned image-archiving application is a typical example, as it is usually impossible to completely scan an alien Blue-ray disc efficiently. (2) The second approach is to utilize prebuilt indexes which are regularly updated [3], [7], [27], [35], [39], [43]. Many desktop search products belong to this category, e.g., Google Desktop [24] and Beagle [5].

While this approach is capable of fast query processing once the (slow) index building process is complete, it may not be suitable or applicable to many just-in-time applications. For instance, index building can be unrealistic for many applications that require just-in-time analytics over an alien file system. Even if index can be built up-front, its significant cost may not be justifiable if the index is not frequently used afterwards. Unfortunately, this is common for some large file systems, e.g., storage archives or scratch data for scientific applications scarcely require the global search function offered by the index, and may only need analytical queries to be answered infrequently (e.g., once every few days). In this case, building and updating an index is often an overkill given the high amortized cost.

There are also other limitations of maintaining an index. For example, prior work [49] has shown that even after a file has been completely removed (from both the file system and the index), the (former) existence of this file can still be inferred from the index structure. Thus, a file system owner may choose to avoid building an index for privacy concerns.

SUMMARY OF THE INVENTION

User interests can often be sufficiently satisfied by approximate (i.e., statistically accurate) answers. The just-in-time sampling-based system is provided that can, after consuming a small number of disk accesses, produce extremely accurate answers for a broad class of aggregate and top-k queries over a file system without the requirement of any prior knowledge. The system is efficient, accurate and scalable.

The present invention provides fast data analytics over large-scale file systems and storage devices. It removes the need of a long wait times for full scans of large-scale file systems and storage devices as well as the need for expensive pre-processing steps that would be required by an index-based approach. Other objects and advantages will also be evident.

To enable just-in-time analytics, one must be able to perform an on-the-fly processing of analytical queries, over traditional file systems that normally have insufficient metadata to support such complex queries. This is achieved by striking a balance between query answer accuracy and cost, i.e., by providing approximate (i.e., statistically accurate) answers which, with a high confidence level, reside within a close distance from the precise answer. For example, when a user wants to count the number of files in a directory (and all of its subdirectories), an approximate answer of 105,000 or 95,000, compared with the real answer of 100,000, makes little difference to the high-level knowledge desired by the user. The higher the cost a user is willing to pay for answering a query, the more accurate the answer can be.

To this end, the just-in-time query processing system produces accurate query answers based on a small number of samples (files or folders) that can be collected from a very large file system with a few disk accesses. The present system is file-system agnostic, i.e., it can be applied instantly over any new file system and work seamlessly with the tree structure of the system. The system removes the need of disk crawling and index building, providing just-in-time analytics without a priori knowledge or pre-processing of the file systems. This is desirable in situations when the metadata indexes are not available, a query is not supported by the index, or query processing is only scarcely needed.

Studies on sampling flat files, hashed files, and files generated by a relational database system (e.g., a B+-tree file) started more than 20 years ago—see survey [42]—and were followed by a myriad of work on database sampling for approximate query processing in decision support systems—see tutorials [4], [16], [23]. A wide variety of sampling techniques, e.g., simple random sampling [41], stratified [10], reservoir [51] and cluster sampling [11], have been used. Nonetheless, sampling has not been used to support efficient aggregate and top-k query processing over a large hierarchical file system, i.e., one with numerous files organized in a complex folder structure (tree-like or directed acyclic graph).

The present invention consists of two algorithms, FS_Agg and FS_TopK, for the approximate processing of aggregate and top-k queries, respectively. For just-in-time analytics over very large file systems, a random descent technique is provided for unbiased aggregate estimations and a pruning-based technique for top-k query processing. The specific characteristics of real-world file systems have been used to derive the corresponding enhancements to the present invention. In particular, according to the distribution of files in real-world file systems, a high-level crawling technique is provided to significantly reduce the error of query processing. Based on an analysis of accuracy and efficiency for the descent process, a breadth-first implementation is utilized to reduce both error and overhead. The system can be utilized, for instance, over both real-world (e.g., NTFS, NFS, Plan 9) and synthetic file systems and provide very reliable results—e.g., 90% accuracy at 20% cost. Furthermore, the invention is scalable to one billion files and millions of directories.

DETAILED DESCRIPTION OF THE PREFERRED EMBODIMENTS

Figure 1:
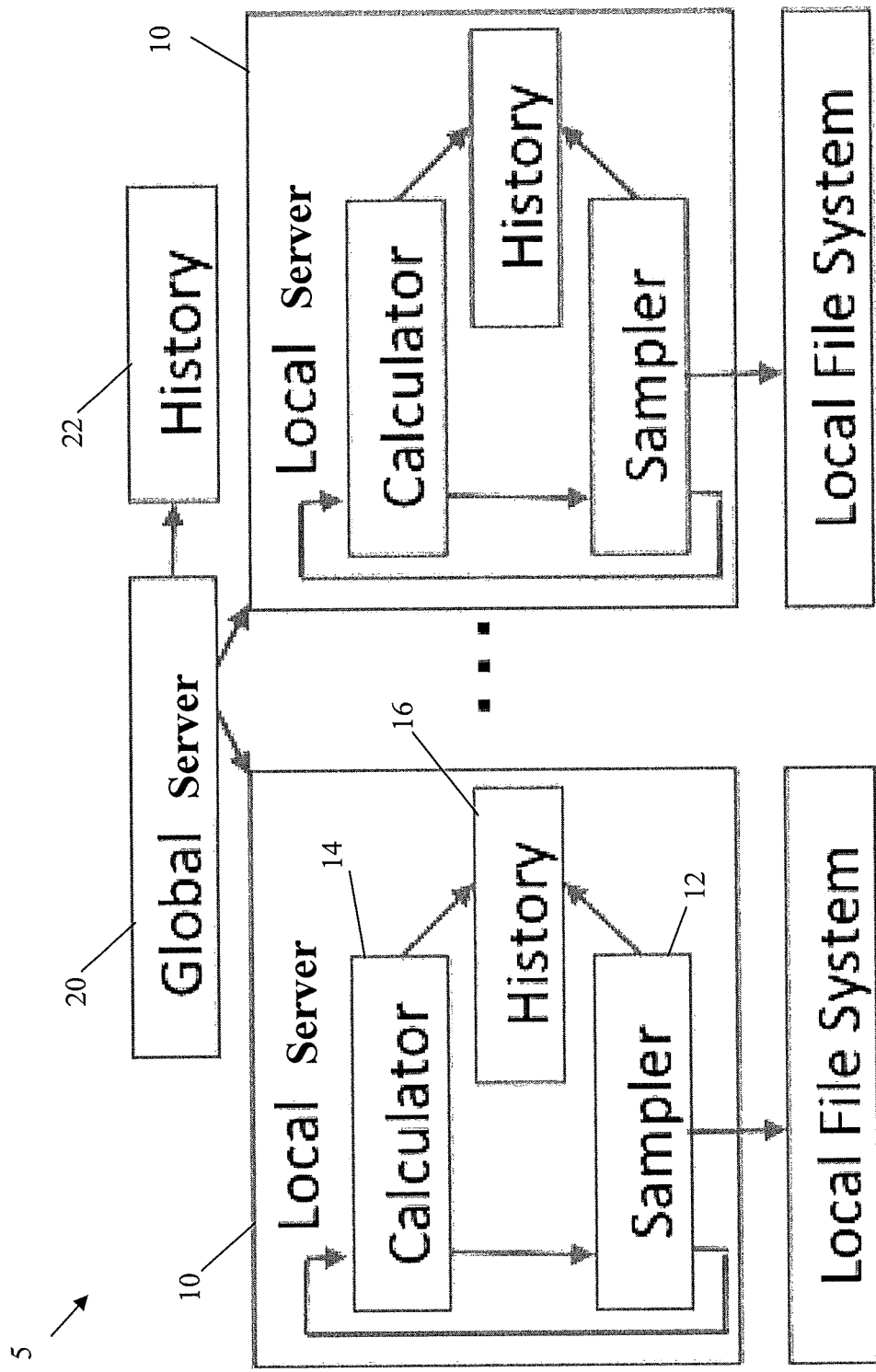
FIG. 1 is a block diagram of the system architecture in accordance with a preferred embodiment of the invention.

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose. The analytical queries will be discussed, i.e., aggregate and top-k ones, with respect to non-limiting illustrative examples of the invention.

Aggregate Queries

In general, aggregate queries are of the form SELECT AGGR(T) FROM D WHERE Selection Condition, where D is a file system or storage device, T is the target piece of information, which may be a metadata attribute (e.g., size, timestamp) of a file or a directory, AGGR is the aggregate function (e.g., COUNT, SUM, AVG), and Selection Condition specifies which files and/or directories are of interest. First, consider a system administrator who is interested in the total number of files in the system. In this case, the aggregate query that the administrator would like to issue can be expressed as:

Q1: SELECT COUNT(files) FROM filesystem;

The operating system provides tools (e.g., Linux's find and Window's dir) to gather statistics for answering such a query. However, because each directory only maintains its local metadata, the operating system has to recursively scan the metadata portion of the file system (e.g., the Master File Table for NTFS), which may lead to a longer running time. Further, the administrator may be interested in knowing the total size of various types of document files, e.g., Q2: SELECT SUM(file.size) FROM filesystem WHERE
file.extension IN { 'txt', 'doc'};

If the administrator wants to compute the average size of all exe files from user John, the query becomes:

Q3: SELECT AVG(file.size) FROM filesystem WHERE
file.extension = 'exe' AND file.owner = 'John';

Aggregate queries can also be more complex. The following example shows a nested aggregate query for scientific computing applications. Suppose that each directory corresponds to a sensor and contains a number of files corresponding to the sensor readings received at different times. A physicist may want to count the number of sensors that has received at least one reading during the last 12 hours:

Q4: SELECT COUNT(directories) FROM filesystem WHERE
EXISTS (SELECT * FROM filesystem WHERE file.dirname =
directory.name AND file.mtime BETWEEN (now − 12 hours)
AND now);

Top-K Queries

Top-k queries are in the form SELECT TOP k FROM D WHERE Selection Condition ORDER BY T DESCENDING/ASCENDING, where T is the scoring function based on which the top-k files or directories are selected. For example, a system administrator may want to select the 100 largest files:

Q5: SELECT TOP 100 files FROM filesystem ORDER BY
file.size DESCENDING;

Another example is to find the ten most recently created directories that were modified yesterday:

```
Q6: SELECT TOP 10 directories FROM filesystem WHERE
directory.mtime BETWEEN (now − 24 hours) AND now
ORDER BY directory.ctime DESCENDING;
```

To approximately answer a top-k query, one shall return a list of k items that share a large percentage of common ones with the precise top-k list. Current operating systems and storage devices do not provide APIs which directly support the above-defined aggregate and top-k queries.

The objective of just-in-time analytics over File Systems of the present invention, is to enable the efficient approximate processing of aggregate and top-k queries over a file system by using the file/directory access APIs provided by the operating system. To complete this, the efficiency and accuracy of query processing must be measured. For ease of description without limitation to the invention, the query efficiency is measured in two metrics: 1) query time, i.e., the runtime of query processing, and 2) query cost, i.e., the ratio of the number of directories visited by the present system to that of crawling the file system (i.e., the total number of directories in the system). For purposes of this illustration, it is assumed that one disk access is required for reading a new directory (of course, the invention can be utilized with any suitable systems, and can provide multiple disk accesses for reading one directory) without knowing the underlying distribution of files in the system. Thus, the query cost approximates the number of disk accesses required by the system. The two metrics, query time and cost, are positively correlated, i.e., the higher the query cost is, more directories the algorithm has to sample, leading to a longer runtime.

While the efficiency measures are generic to both aggregate and top-k query processing, the measures for query accuracy are different. For aggregate queries, the query accuracy is the relative error of the approximate answer apx compared with the precise one ans—i.e., |apx−ans|/|ans|. For top-k queries, the accuracy is the percentage of items that are common in the approximate and precise top-k lists. The accuracy level required for approximate query processing depends on the intended application.

System Architecture

In accordance with a non-limiting example of FIG. 1, the present invention has the following three properties: 1) scalability—the system 5 should work on file systems consisting of thousands to billions of files. It should also support local file systems 7 as well as distributed file systems which cover thousands of machines (i.e., local components 10) in a large organization. 2) accuracy—the system 5 should provide high accuracy for a large class of aggregate and top-k queries. 3) efficiency—the system 5 should minimize both the number of disk accesses and the run time. To this end, the system 5 features a two-level architecture which is depicted in FIG. 1. The lower level consists of local components 10 running independently to provide just-in-time analytics over the local file system 7. The upper level is a global component 20 which manages the execution of the local components 10 to produce global query answers.

As shown in FIG. 1, each local component 10 of the system 5 has three primary modules: a sampler 12 which draws samples from the local file system 7, a calculator 14 which estimates local query answers based on the samples, and a history module 16 which saves the historically issued queries and their answers. The main process of (approximate) query processing is handled by the sampler 12 and the calculator 14.

Note that both modules 12, 14 can be launched in an iterative fashion (e.g., by taking a sample and re-calculating) to achieve a desired level of tradeoff between accuracy and cost. To determine whether to collect more samples to refine the estimation, the user-determined stopping condition can be specified on either accuracy or cost—e.g., an upper bound on the run time or the estimation variance. If an upper bound on the estimation variance is specified, the variance can be approximated with the sample variance after finite-population correction [15].

The history module 16 is designed to reduce the cost of sampling. It stores the previous estimations (generated by the sampler 12 and the calculator 14) over parts (e.g., subtrees) of the file system. The idea is that the sampler 12 (in future executions) can leverage the history to limit the search space to the previously unexplored part of the file system, unless it determines that the history is obsolete (e.g., according to a pre-defined validity period). Note that the history is continuously updated by the sampler 12 and the calculator 14 to include newly discovered directories and to update the existing estimations. The local history module 16 stores local history information on query and samples, while the global history module 22 stores global history information. A global system can have tens or hundreds of thousands of local components 10.

To support query processing over a distributed file system, the system 5 includes a global component 20 which manages the local components 10 for individual file systems. Here it is assumed that there exists a directory service which can be utilized by the system 5 to communicate with the distributed machines (i.e., local components 10). Note that to answer a global query, it is not necessary for the system 5 to sample every local file system 7, especially when there is a large number of them. A simple approach is for the global component 20 to choose a small number of file systems uniformly at random and then run the local components 10 over these selected systems. Based on the local results, the global calculator (which can be implemented as part of the history module 22) can estimate an aggregate result for the global system.

The local component 10 on each local file system 7 works independently, requiring neither synchronization nor communication (with each other). This makes the system 5 highly scalable to a distributed system. For example, in the event where a local system 10 becomes unavailable, busy, or takes a considerable amount of time for response, another local component 10 can be selected as a replacement, making the overall system 5 resilient to system and network faults, which are the norm in a distributed environment.

The system 5 preferably includes a computer processor or processing platform that is capable of performing the functions and operations of the invention including the algorithms (e.g., FS_Agg and FS_TopK). The computer processor or processing platform preferably includes an input device for receiving input form a user to execute the functions and operations, and it is preferably in electronic data communication with the large file system on which those analytics are performed, such as via a secured network connection, by reading and/or writing to/from a disk in a disk drive, or by other suitable electronic data exchange mechanism. The system 5 can be implemented on a website, over a network, or on a standalone computer. All or parts of those algorithms and/or file systems can be stored on or read from a memory, computer-readable medium, or other suitable storage device, such as a memory stick, downloadable file, or CD Rom.

For instance, the sampler 12 and calculator 14 can be implemented by one or more computer processors, the history module 16 can be stored at a cached in memory and the full content can be saved in memory. The local component 10 can be locally or remotely located with respect to the local file system 7. In addition, the calculator 14 can implement the operations described below. And, information communicated from the local components 10 to the global server 20 includes results from the calculation and/or sample information.

Aggregate Query Processing

This section describes FS_Agg, which is the algorithm for processing aggregate queries. A vanilla algorithm, FS_Agg_Basic, illustrates the main idea of aggregate estimation without bias through a random descent process within a file system. To make the vanilla algorithm practical over very large file systems, high-level crawling leverages the special properties of a file system to reduce the standard error of estimation, and breadth-first implementation improves both accuracy and efficiency of query processing. All three techniques are then combined to produce FS_Agg.

FS_Agg_Basic

In general, the folder organization of a file system can be considered as a tree or a directed acyclic graph (DAG), depending on whether the file system allows hard links to the same file. The random descent process discussed below can be applied to both cases with little change. For the ease of understanding, the case of tree-like folder structure is examined first, and then a simple extension to DAG is discussed at the end of this subsection.

Figure 2:
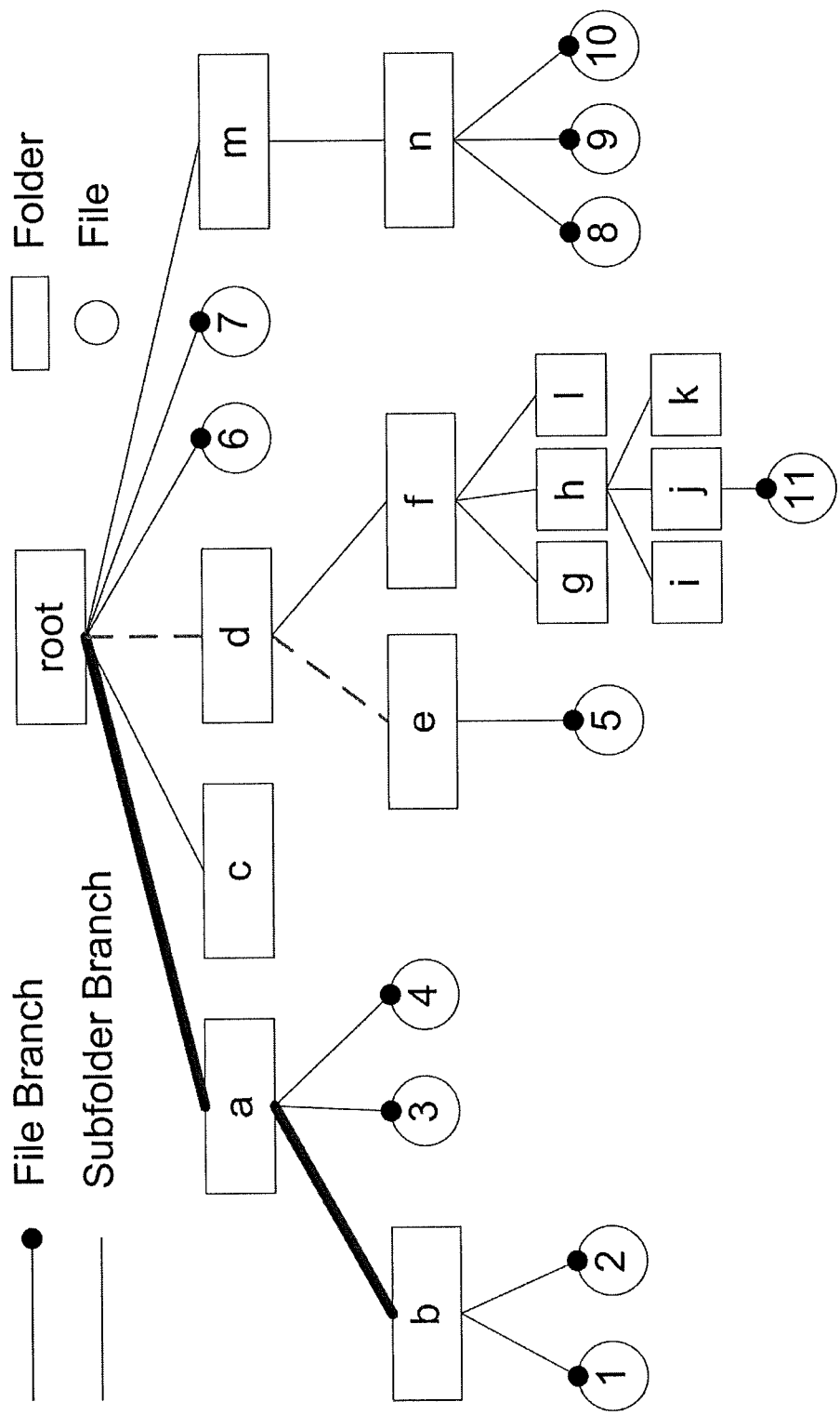
FIG. 2 is a tree-like structure showing random descents.

FIG. 2 depicts a tree structure with root corresponding to the root directory of a file system, which we shall use as a running non-limiting example of the invention for ease of description. There are two types of nodes in the tree: folders (directories) and files. A file is always a leaf node. The children of a folder consist of all subfolders and files in the folder. The branches coming out of a folder node are called subfolder-branches and file-branches, respectively, according to their destination type. A folder with no subfolder-branches is referred to here as a leaf-folder. Note that this differs from a leaf in the tree, which can be either a file or a folder containing neither subfolder nor file. The random descent process starts from the root and ends at a leaf-folder. At each node, a subfolder branch of the node is chosen uniformly at random for further exploration. During the descent process, all file branches encountered at each node along the path are evaluated, and an aggregate estimation is generated based on these file branches.

As a non-limiting illustration of the invention, consider an example of estimating the COUNT of all files in the system. At the beginning of random descent, the root is accessed by the sampler 12 to obtain the number of its file- and subfolder-branches $f_0$ and $s_0$, respectively, and record them as the evaluation for the root. Then, a subfolder-branch is randomly chosen for further descent, and this process is repeated until the system arrives at a folder with no subfolder. Suppose that the descent process continues for h (h≥1) steps, and the numbers recorded for the i-th step (i∈[1,h]) is $f_i$ and $s_i$, for the number of file- and subfolder-branches, respectively. Note that $s_h=0$ because each descent ends at a leaf-folder. The COUNT of all files is estimated as equation (1):

$$\tilde{n} = \sum_{i=0}^{h}\left(f_i \cdot \prod_{j=0}^{i-1} s_j\right),\quad (1)$$

WHERE $\prod_{j=0}^{i-1} s_j$ is assumed to be 1 when i=0.

Two examples of the random descent process are shown in FIG. 2 and marked by heavy solid lines and dashed lines, respectively. The solid descent example starts at the root level, and the system randomly decides from amongst folders a, c, d, m and has chosen to examine folder a, then examines folder b. This produces $<f_0, f_1, f_2>=<2, 2, 2>$, whereby there are 2 files (6, 7) at the root level, 2 files (3, 4) at the first sub-folder level (for folder a), and 2 files (1, 2) at the second sub-folder level (for folder b). This also produces $<s_0, s_1, s_2>=<4, 1, 0>$, whereby there are 4 sub-folder branches (a, c, d, m) at the root level, 1 sub-folder branch (b) at the first sub-folder level, and zero subfolder branches at the second sub-folder level. Using equation (1), this leads to an estimation of 2+8+8=18. The sampled values (i.e., the 2, 2, 2 and the 4, 1, 0) are drawn by the sampler 12, the estimation is determined by the calculator 14 and stored in the history module 16. The dashed line descent example produces $<f_0, f_1, f_2>=<2, 0, 1>$ and $<s_0, s_1, s_2>=<4, 2, 0>$, leading to an estimation of 2+0+8=10. As shown in the figure, there an actual total of 11 files in the structure. By examining a single random descent through to a leaf folder, the solid line example estimates that there are a total of 18 files in the tree structure, and the dashed line example estimates that there are a total of 10 files in the tree structure.

Once the descent arrives at a leaf folder (folder b in the solid line example, and folder e in the dashed line example), the process ends. The random descent process need only be performed a single time, with only one folder being selected at a given level of the architecture. However, the process can be repeated multiple times (by restarting from the root) to produce a more accurate result (by taking the average of estimations generated by all descents). Thus, averaging the two examples provides an estimate of 14 total files ((18+10)/2). A random descent removes any user bias and normalizes the probability to obtain consistency throughout file system architecture.

The estimation produced by each random descent process is completely unbiased—i.e., the expected value of the estimation is exactly equal to the total number of files in the system. To understand why, consider the total number of files at the i-th level (with root being Level 0) of the tree (e.g., Files 1 and 2 in FIG. 2 are at Level 3), denoted by $F_i$. According to the definition of a tree, each i-level file belongs to one and only one folder at Level i−1. For each (i−1)-level folder $v_{i-1}$, let $|v_{i-1}|$ and $p(v_{i-1})$ be the number of (i-level) files in $v_{i-1}$ and the probability for $v_{i-1}$ to be reached in the random descent process, respectively. As shown by equation (2), $|v_{i-1}|/p(v_{i-1})$ is an unbiased estimation for F(i) because $$E\left(\frac{|v_{i-1}|}{p(v_i-1)}\right) = \sum_{v_{i-1}}\left(p(v_{i-1}) \cdot \frac{|v_{i-1}|}{p(v_{i-1})}\right) = F_i. \quad (2)$$

With the random descent process, the probability $p(v_{i-1})$ is shown in equation (3):

$$p(v_{i-1}) = \prod_{j=0}^{i-2} \frac{1}{s_j(v_{i-1})}, \quad (3)$$

where $s_j(v_{i-1})$ is the number of subfolder-branches for each node encountered on the path from the root to $v_{i-1}$. The estimation in equation (1) is essentially the sum of the unbiased estimations in equation (2) for all i∈[1,m], where m is the maximum depth of a file. Thus, the estimation generated by the random descent is unbiased.

The unbiasedness of the random decent process completely eliminates a major component of estimation error (note that the mean square error of estimation, MSE, is the sum of bias² and variance of estimation). Reducing the other component of estimation error, i.e., estimation variance, will be discussed below.

While the above example is for estimating the COUNT of all files, the same random descent process can be used to process queries with other aggregate functions (e.g., SUM, AVG), with selection conditions (e.g., COUNT all files with extension '.JPG'), and in file systems with a DAG instead of tree structure. The only change required for all these extensions is on the computation of $f_i$, which is done by the calculator 14.

For the COUNT query, $f_i$ is set to the number of files in a folder. To process a SUM query over a file metadata attribute (e.g., file size), $f_i$ is set as the SUM of such an attribute over all files in the folder (e.g., total size of all files), which is performed by the calculator 14. In the running example, consider the estimation of SUM of numbers shown on all files in FIG. 2. The solid and dashed random walks will return $<f_0, f_1, f_2> = <15, 7, 3>$ and $<15, 0, 5>$, respectively, leading to the same estimation of 55, which is performed by the calculator 14. The unbiasedness of such an estimation follows in analogy from the COUNT case.

A simple way to process an AVG query is to estimate the corresponding SUM and COUNT respectively, and compute AVG as SUM/COUNT. Note, however, that such estimation is no longer unbiased, because the division of two unbiased estimations is not necessarily unbiased. While an unbiased AVG estimation may be desired for certain applications, we have proved a negative result that it is impossible to answer an AVG query without bias unless one accesses the file system for almost as many as times as crawling the file system. The details are shown in Just-In-Time Analytics on Large File Systems, IEEE Transactions on Computers, H. Huang et al., Vol. 6, No. 1, March 2011, the contents of which are hereby incorporated by reference. Estimating AVG as SUM/COUNT is in general very accurate.

To process a query with selection conditions, the only change required is on the computation of $f_i$. Instead of evaluating $f_i$ over all file branches of a folder, to answer a conditional query, we only evaluate $f_i$ over the files that satisfy the selection conditions. For example, to answer a query SELECT COUNT(*) FROM Files WHERE file.extension='JPG', $f_i$ is set as the number of files under the current folder with extension JPG. Similarly, to answer "SUM(file_size) WHERE owner=John", $f_i$ is set to the SUM of sizes for all files (under the current folder) which belong to John. Due to the computation of $f_i$ for conditional queries, the descent process may be terminated early to further reduce the cost of sampling. Again consider the query condition of (owner=John). If the random descent reaches a folder which cannot be accessed by John, then it has to terminate immediately because of the lack of information for further descent.

Finally, for a file system featuring a DAG (instead of tree) structure, the computation of $f_i$ can be changed. Almost all DAG-enabled file systems (e.g., ext2, ext3, NTFS) provide a reference count for each file which indicates the number of links in the DAG that point to the file. (In ext2 and ext3, for example, the system provides the number of hard links for each file. Note that for soft links, those can be ignored during the descent process. Thus, they bear no impact on the final estimation.) For a file with r links, if the original algorithm discussed above is used, then the file will be counted r times in the estimation. Thus, its impact is discounted on each estimation with a factor of 1/r. For example, if the query being processed is the COUNT of all files, then the system computes $f_i = \Sigma_{j \in F}(1/r(f))$, where F is the set of files under the current folder, and r(f) is the number of links to each file f. Similarly, to estimate the SUM of all file sizes, the system computes $f_i = \Sigma_{j \in F}(size(f)/r(f))$, where size(f) is the file size of file f. With this discount factor, an unbiased estimation is maintained over a DAG file system structure.

Disadvantages of FS_Agg_Basic

While the estimations generated by FS_Agg_Basic is unbiased for SUM and COUNT queries, the error of an estimation comes from not only bias but also variance (i.e., standard error). A problem of FS_Agg_Basic is that it may produce a high estimation variance for file systems with an undesired distribution of files, as illustrated by the following: the variance of estimation produced by a random descent on the number of h-level files $F_h$ is in equation (4):

$$\sigma(h)^2 = \left(\sum_{v \in L_{h-1}} \left(|v|^2 \cdot \prod_{j=0}^{h-2} s_j(v)\right)\right) - F_h^2. \quad (4)$$

where $L_{h-1}$ is the set of all folders at Level h−1, |v| is the number of files in a folder v, and $s_j(v)$ is the number of subfolders for the Level-j node on the path from the root to v. Consider an (h−1)-level folder v. If the random descent reaches v, then the estimation it produces for the number of h-level files is |v|/p(v), where p(v) is the probability for the random descent to reach v. Let δ(h) be the probability that a random descent terminates early before reaching a Level-(h−1) folder. Since each random descent reaches at most one Level-(h−1) folder, the estimation variance for $F_h$, is in equations (5), (6) and (7):

$$\sigma(h)^2 = \delta(h) \cdot F_h^2 + \sum_{v \in L_{h-1}} p(v) \cdot \left(\frac{|v|}{p(v)} - F_h\right)^2 \quad (5)$$

$$= \delta(h) \cdot F_h^2 + \sum_{v \in L_{h-1}} \left(\frac{|v|^2}{p(v)} - 2|v|F_h + p(v) \cdot F_h^2\right) \quad (6)$$

$$= \left(\sum_{v \in L_{h-1}} \frac{|v|^2}{p(v)}\right) - F_h^2 \quad (7)$$

Since $p(v) = 1/\Pi_{j=0}^{h-2} s_j(v)$, the process is proved.

The existence of two types of folders may lead to an extremely high estimation variance: One type is high-level leaf-folders (i.e., "shallow" folders with no subfolders). Folder c in FIG. 2 is an example. To understand why such folders lead to a high variance, consider equation (7). Note that for a large h, a high-level leaf-folder (above Level-(h−1)) reduces $\Sigma_{v \in L_{H-1}} p(v)$ because once a random descent reaches such a folder, it will not continue to retrieve any file in Level-h (e.g., Folder c in FIG. 2 stops further descents for h=3 or 4). As a result, the first item in (7) becomes higher, increasing the estimation variance. For example, after removing Folder c from FIG. 2, the estimation variance for the number of files on Level 3 can be reduced from 24 to 9.

The other type of "ill-conditioned" folders are those deep-level folders which reside at much lower levels than others (i.e., with an extremely large h). An example is Folder j in FIG. 2. The key problem arising from such a folder is that the probability for it to be selected is usually extremely small, leading to an estimation much larger than the real value if the folder happens to be selected. As shown, a larger h leads to a higher $\Pi s_j(v)$, which in turn leads to a higher variance. For example, Folder j in FIG. 2 has $\Pi s_j(v)=4\times2\times3\times3=72$, leading to a estimation variance of $72-1=71$ for the number of files on Level 5 (which has a real value of 1).

FS_Agg

To reduce the estimation variance, high-level crawling and breadth-first descent can be utilized to address the two above-described problems on estimation variance, high-level leaf-folders and deep-level folders, respectively. Also, the variance generated by FS_Agg can be estimated in practice, effectively producing a confidence interval for the aggregate query answer.

High-Level Crawling is designed to eliminate the negative impact of high-level leaf-folders on estimation variance. The main idea of high-level crawling is to access all folders in the highest i levels of the tree by following all subfolder-branches of folders accessed on or above Level-(i–1). Then, the final estimation becomes an aggregate of two components: the precise value over the highest i levels and the estimated value (produced by random descents) over files below Level-i. From the design of high-level crawling that now leaf-folders in the first i levels no longer reduce p(v) for folders v below Level-i (and therefore no longer adversely affect the estimation variance). Formally, the following demonstrates the effectiveness of high-level crawling on reducing the estimation variance: if $r_0$ out of r folders crawled from the first i levels are leaf-folders, then the estimation variance produced by a random descent for the number of Level-h files $F_h$ satisfies $$\sigma_{HLC}(h)^2 \le \frac{(r-r_0)\cdot\sigma(h)^2 - r_0 \cdot F_h^2}{r}. \quad (8)$$

Before high-level crawling is applied, if the random descent process reaches any of the leaf-folders on the first i levels, it in effect returns an estimation of 0 for the number of Level-h files. If $r_0$ out of r crawled folders are leaf-folders, the random descent process has a probability of at least $r_0/r$ to return an estimation of 0 for the number of Level-h files. According to (7), there is $$\sigma_{HLC}(h)^2 \le \frac{(\sigma(h)^2 + F_h^2)\cdot(r-r_0)}{r} - F_h^2 \quad (9)$$

$$= \frac{(r-r_0)\cdot\sigma(h)^2 - r_0 \cdot F_h^2}{r}. \quad (10)$$

According to this, if a high-level crawling is applied over the first level in FIG. 2, then the estimation variance for the number of files on Level 3 is at most $(3\cdot24-1\cdot36)/4=9$. As discussed below, that the variance of estimation after removing Folder c (the only leaf-folder at the first level) is exactly 9. Thus, the bound in equation (8) is tight in this case.

Breadth-First Descent is designed to bring two advantages over FS_Agg_Basic: variance reduction and runtime improvement. Variance Reduction: breadth-first descent starts from the root of the tree. Then, at any level of the tree, it generates a set of folders to access at the next level by randomly selecting from subfolders of all folders it accesses at the current level. Any random selection process would work—as long as we know the probability for a folder to be selected, we can answer aggregate queries without bias in the same way as the original random descent process. For example, to COUNT the number of all files in the system, an unbiased estimation of the total number of files at Level i is the SUM of $|v_{i-1}|/p(v_{i-1})$ for all Level-(i–1) folders $v_{i-1}$ accessed by the breadth-first implementation, where $|v_{i-1}|$ and $p(v_{i-1})$ are the number of file-branches and the probability of selection for $v_{i-1}$, respectively.

The following random selection process is utilized in the present invention. Consider a folder accessed at the current level which has $n_0$ subfolders. From these $n_0$ subfolders, we sample without replacement $\min(n_0, \max(p_{sel}\cdot n_0, s_{min}))$ ones for access at the next level. Here $p_{sel}\in(0,1]$ (where sel stands for selection) represents the probability of which a subfolder will be selected for sampling, and $s_{min}\ge 1$ states the minimum number of subfolders that will be sampled. Both $p_{sel}$ and $s_{min}$ are user-defined parameters, the settings for which are discussed below based on characteristics of real-world file systems.

Compared with the original random descent design, this breadth-first random selection process significantly increases the selection probability for a deep folder. Recall that with the original design, while drilling down one level down the tree, the selection probability can decrease rapidly by a factor of the fan-out (i.e., the number of subfolders) of the current folder. With breadth-first descent, on the other hand, the decrease is limited to at most a factor of $1/p_{sel}$, which can be much smaller than the fan-out when $p_{sel}$ is reasonably high (e.g., =0.5 as suggested below). As a result, the estimation generated by a deep folder becomes much smaller. Formally is the following: with breadth-first descent, the variance of estimation on the number of h-level files $F_h$ satisfies $$\sigma_{BFS}(h)^2 \le \left(\sum_{v\in L_{h-1}} \frac{|v|^2}{p_{sel}^{h-1}}\right) - F_h^2. \quad (11)$$

From (7), $$\sigma(h)^2 = \left(\sum_{v\in L_{h-1}} \frac{|v|^2}{p(v)}\right) - F_h^2. \quad (12)$$

With breadth-first descent, the probability for the random descent process to reach a node v at Level-h is at least $p_{sel}^{h-1}$. Thus, $$\sigma_{BFS}(h)^2 \le \left(\sum_{v\in L_{h-1}} \frac{|v|^2}{p_{sel}^{h-1}}\right) - F_h^2. \quad (13)$$

From a comparison with equation (4) that the factor of $\Pi s_j(v)$ in the original variance, which can grow to an extremely large value, is now replaced by $1/p_{sel}^{h-1}$ which can be better controlled by the system 5 to remain at a low level even when h is large.

Runtime Improvement: In the original design of FS_Agg_Basic, random descent has to be performed multiple times to reduce the estimation variance. Such multiple descents are very likely to access the same folders, especially the high-level ones. While the history of hard-drive accesses can be leveraged by caching all historic accesses in memory, such as history module 22, such repeated accesses can still take significant CPU time for in-memory look up. The breadth-first design, on the other hand, ensures that each folder is accessed at most once, reducing the runtime overhead of the present system.

Variance Produced by FS_Agg: An important issue for applying FS_Agg in practice is how to estimate the error of approximate query answers it produces. Since FS_Agg generates unbiased answers for SUM and COUNT queries, the key factor for error estimation here is an accurate computation of the variance. From (11), the variance depends on the specific structure of the file system, in particular the distribution of selection probability $p_{sel}$ for different folders. Since the sampling-based algorithm does not have a global view of the hierarchical structure, it cannot precisely compute the variance.

Fortunately, the variance can still be accurately approximated in practice. To understand how, consider first the depth-first descents used in FS_Agg_Basic. Each descent returns an independent aggregate estimation, while the average for multiple descents becomes the final approximate query answer. Let $\tilde{q}_1, \ldots, \tilde{q}_h$ be the independent estimations and $\tilde{q}=(\Sigma \tilde{q}_i)/h$ be the final answer. A simple method of variance approximation is to compute $\text{var}(\tilde{q}_1, \ldots, \tilde{q}_h)/h$, where $\text{var}(\cdot)$ is the variance of independent estimations returned by the descents. Note that if we consider a population consisting of estimations generated by all possible descents, then $\tilde{q}_1, \ldots, \tilde{q}_h$ form a sample of the population. As such, the variance computation is approximating the population variance by sample variance, which are asymptotically equal (for an increasing number of descents).

Figure 3:
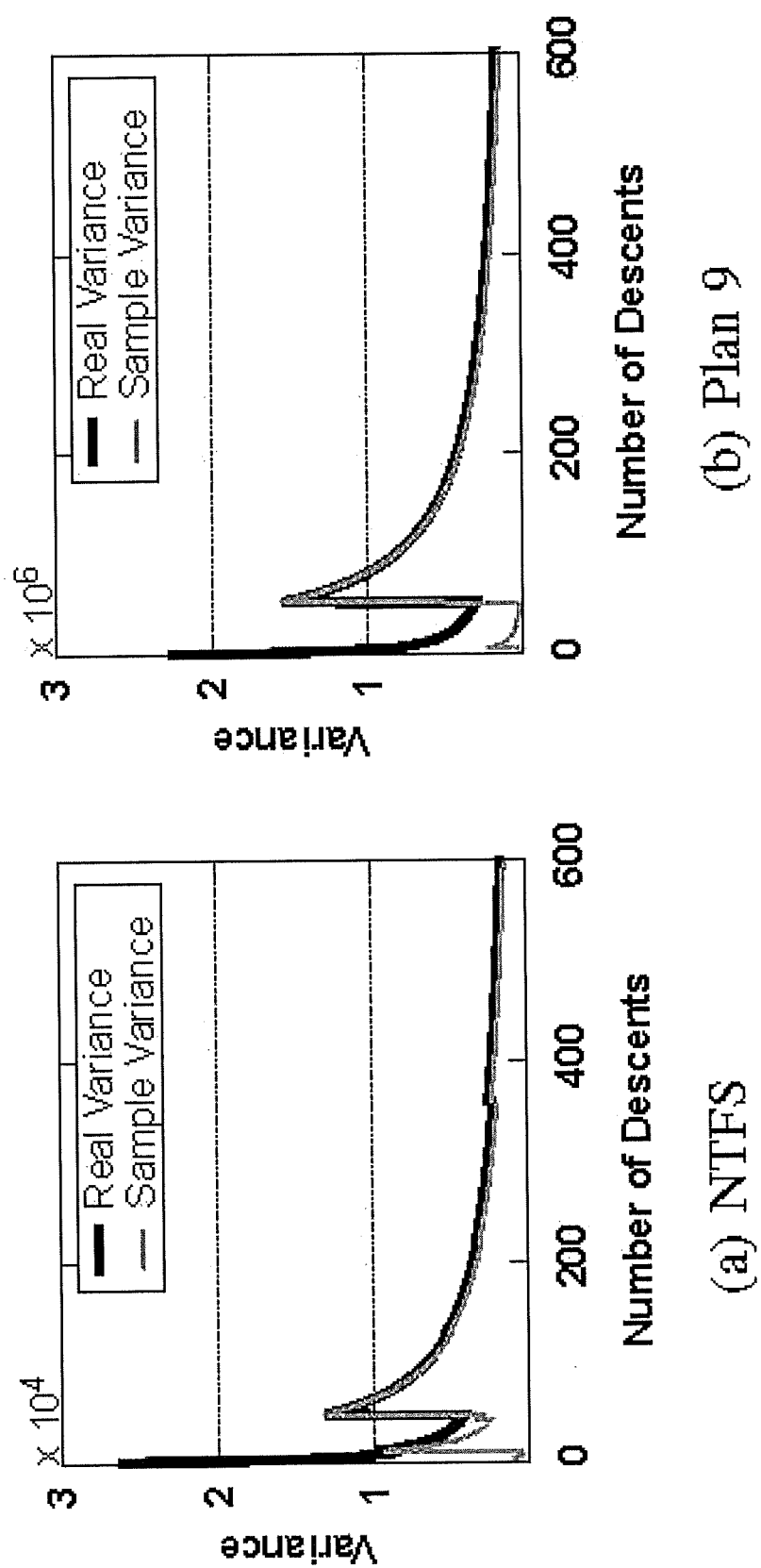
FIG. 3 is a plot showing the variance approximation for two files systems, (a) NTFS and (b) Plan 9 (real and sample variances are overlapped when the number of descents is sufficiently large)

We conducted extensive experiments to verify the accuracy of such an approximation. FIG. 3 shows two examples for counting the total number of files in an NTFS and a Plan 9 file system, respectively. Observe from the figure that the real variance oscillates in the beginning of descents. For example, we observe at least one spike on each file system within the first 100 descents. Such a spike occurs when one descent happens to end with a deep-level file which returns an extremely large estimation, and is very likely to happen with our sampling-based technique. Nonetheless, note that the real variance converges to a small value when the number of descents is sufficiently large (e.g., >400). Also note that for two file systems after a small number of descents (about 50), the sample variance $\text{var}(\tilde{q}_1, \ldots, \tilde{q}_h)/h$ becomes an extremely accurate approximation for the real (population) variance (overlapping shown in FIG. 3), even during the spikes. One can thereby derive an accurate confidence interval for the query answer produced by FS_Agg_Basic.

While FS_Agg no longer performs individual depth-first descents, the idea of using sample variance to approximate population variance still applies. In particular, note that for any given level, say Level-i, of the tree structure, each folder randomly chosen by FS_Agg at Level-(i−1) produces an independent, unbiased, estimation for SUM or COUNT aggregate over all files in Level-i. Thus, the variance for an aggregate query answer over Level-i can be approximated based on the variance of estimations generated by the individual folders. The variance of final SUM or COUNT query answer (over the entire file system) can be approximated by the SUM of variances for all levels.

Top-K Query Processing

Recall that for a given file system, a top-k query is defined by two elements: the scoring function and the selection conditions. Without loss of generality, we consider a top-k query which selects k files (directories) with the highest scores. Here we focus on top-k queries without selection conditions, and consider a tree-like structure of the file system. The extensions to top-k queries with selection conditions and file systems with DAG structures follow in analogy from the same extensions for FS_Agg.

Main Idea

A simple way to answer a top-k query is to access every directory to find the k files with the highest scores. The objective of FS_TopK is to generate an approximate top-k list with far fewer hard-drive accesses. To do so, FS_TopK consists of the following three steps.

First, Lower-Bound Estimation: The first step uses a random descent similar to FS_Agg to generate an approximate lower bound on the k-th highest score over the entire file system (i.e., among files that satisfy the selection conditions specified in the query).

Second, Highest-Score Estimations and Tree Pruning: In the second step, we prune the tree structure of the file system according to the lower bound generated in Step 1. In particular, for each subtree, we use the results of descents to generate an upper-bound estimate on the highest score of all files in the subtree. If the estimation is smaller than the lower bound from Step 1, we remove the subtree from search space because it is unlikely to contain a top-k file. Note that in order for such a pruning process to have a low false negative rate—i.e., not to falsely remove a large number of real top-k files, a key assumption we are making here is the "locality" of scores—i.e., files with similar scores are likely to co-locate in the same directory or close by in the tree structure (the "distance" between two files generally refers to the length of the shortest path connecting the two files in the tree structure. The shorter the distance is, the "closer" the two files would be). Intuitively, the files in a directory are likely to have similar creation and update times. In some cases (e.g., images in the "My Pictures" directory, and outputs from a simulation program), the files will likely have similar sizes too. Note that the strength of this locality is heavily dependent on the type of the query and the semantics of the file system on which the query is running.

Third, Crawling of the Selected Tree: Finally, we crawl the remaining search space—i.e., the selected tree—by accessing every folder in it to locate the top-k files as the query answer. Such an answer is approximate because some real top-k files might exist in the nonselected subtrees, albeit with a small probability.

In the running example, consider a query for the top-3 files with the highest numbers shown in FIG. 2. Suppose that Step 1 generates a (conservative) lower bound of 8, and the highest scores estimated in Step 2 for subtrees with roots a, c, d, and m are 5, −1 (i.e., no file), 7, and 15, respectively—the details of these estimations will be discussed shortly. Then, the pruning step will remove the subtrees with roots a, c, and d, because their estimated highest scores are lower than the lower bound of 8. Thus, the final crawling step only needs to access the subtree with root of m. In this example, the algorithm would return the files identified as 8, 9, and 10, locating two top-3 files while crawling only a small fraction of the tree. Note that the file with the highest number 11 could not be located because the pruning step removes the subtree with root of d.

Detailed Design

The design of FS_TopK is built upon a hypothesis that the highest scores estimated in Step 2, when compared with the lower bound estimated in Step 1, can prune a large portion of the tree, significantly reducing the overhead of crawling in Step 3. In the following, we first describe the estimations of the lower bound and the highest scores in Steps 1 and 2, and then discuss the validity of the hypothesis for various types of scoring functions.

Both estimations in the two steps can be made from the order statistics [21] of files retrieved by the random descent process in FS_Agg. The reason is that both estimations are essentially on the order statistics of the population (i.e., all files in the system)—The lower bound in Step 1 is the k-th largest order statistics of all files, while the highest scores are on the largest order statistics of the subtrees. We refer readers to [21] for details of how the order statistics of a sample can be used to estimate that of the population and how accurate such estimation is.

While sampling for order statistics is a problem in its own right, for the purpose of this discussion, the following simple approach is provided which, according to real-world file system embodiments, suffices for answering top-k queries accurately and efficiently over almost all tested systems. For the lower-bound estimation in Step 1, we use the sample quantile as an estimation of the population quantile. For example, to estimate the 100-th largest score of a system with 10,000 files, we use the largest score of a 100-file sample as an estimation. Our tests show that for many practical scoring functions (which usually have a positive skew, as discussed below), the result serves as a conservative lower bound desired by FS_TopK. For the highest-score estimation in Step 2, we compute $\gamma \cdot \max(\text{sample scores})$, where $\gamma$ is a constant correction parameter. The setting of $\gamma$ captures a tradeoff between the crawling cost and the chances of finding top-k files—when a larger $\gamma$ is selected, fewer subtrees are likely be removed.

We now discuss when the hypothesis of heavy pruning is valid and when it is not. Ideally, two conditions should be satisfied for the hypothesis to hold: (1) If a subtree includes a top-k file, then it should include a (relatively) large number of highly scored files, in order for the sampling process (in Step 2) to capture one (and to thereby produce a highest-score estimation that surpasses the lower bound) with a small query cost. And (2) on the other hand, most subtrees (which do not include a top-k file) should have a maximum score significantly lower than the k-th highest score. This way, a large number of subtrees can be pruned to improve the efficiency of top-k query processing. In general, a scoring function can be constructed that satisfies both or neither of the above two conditions. We focus on a special class of scoring functions: those following a heavy-tailed distributions (i.e., its cumulative distribution function $F(\cdot)$ satisfies $\lim_{x \to \infty} e^{\lambda x}(1-F(x)) = \infty$ for all $\lambda > 0$). Existing studies on real-world file system traces showed that many file/directory metadata attributes, which are commonly used as scoring functions, belong to this category [2]. For example, the distributions of file size, last modified time, creation time, etc., in the entire file system or in a particular subtree are likely to have a heavy tail on one or both extremes of the distribution.

A key intuition is that scoring functions defined as such attribute values (e.g., finding the top-k files with the maximum sizes or the latest modified time) usually satisfy both conditions: First, because of the long tail, a subtree which includes a top-k scored file is likely to include many other highly scored files too. Second, since the vast majority of subtrees have their maximum scores significantly smaller than the top-k lower bound, the pruning process is likely to be effective with such a scoring function.

We would also like to point out an "opposite" class of scoring functions for which the pruning process is not effective: the inverse of the above scoring functions—e.g., the top-k files with the smallest sizes. Such a scoring function, when used in a top-k query, selects k files from the "crowded" light-tailed side of the distribution. The pruning is less likely to be effective because many other folders may have files with similar scores, violating the second condition stated above. Fortunately, asking for top-k smallest files is not particularly useful in practice, also because of the fact that it selects from the crowded side—the answer is likely to be a large number of empty files.

Implementation

One non-limiting illustrative embodiment of the invention includes all three algorithms (FS_Agg_Basic, FS_Agg and FS_TopK) in 1,600 lines of C code in Linux. A simulator in Matlab can complete a large number of tests within a short period of time. While the implementation was built upon the ext3 file system, the algorithms are generic to any hierarchical file system and the current implementation can be easily ported to other platforms, e.g., Windows and Mac OS. FS_Agg_Basic has only one parameter: the number of descents. FS_Agg has three parameters: the selection probability $p_{sel}$, the minimum number of selections $s_{min}$ and the number of (highest) levels for crawling h. Our default parameter settings are $p_{sel}=50\%$, $s_{min}=3$, and $h=4$. We also tested with other combinations of parameter settings. FS_TopK has one additional parameter, the (estimation) enlargement ratio $\gamma$. The setting of $\gamma$ depends on the query to be answered, which shall be explained later.

The invention can be implemented, for instance, on Linux machines with Intel Core 2 Duo processor, 4 GB RAM, and 1 TB Samsung 7200 RPM hard drive. The file system traces can be captured from various operating systems—as such, the subtle differences between OS implementations may lead to different performance figures in terms of file-system access time. Nonetheless, the vast majority of the implementations are not directly testing the file system performance, but the accuracy and access cost measures which are not affected by the specific file system as long as the tree structure is determined. Unless otherwise specified, we ran each experiment for five times and reported the averages.

Windows File Systems embodiment: The Microsoft traces [2] includes the snapshots of around 63,000 file systems, 80% of which are NTFS and the rest are FAT. For each file system, the trace includes a separate entry for each file and directory in the system, recording its metadata attributes (e.g., size and timestamps). This enabled us to reconstruct the file system by first creating the directory tree structure, and then populating all files into the corresponding directories. We also set the metadata attributes for all files and directories according to the trace entries. To test the present invention over file systems with a wide range of sizes, we first selected from the traces two file systems, m100 K and m1 M (the first 'm' stands for Microsoft trace), which are the largest file systems with less than 100 K and 1 M files, respectively. Specifically, m100 K has 99,985 files and 16,013 directories, and m1 M has 998,472 files and 106,892 directories. We also tested the largest system in the trace, m10 M, which has the maximum number of files (9,496,510) and directories (789,097). We put together the largest 33 file systems in the trace to obtain m100 M that contains over 100 M files and 7 M directories. In order to evaluate next-generation billion-level file systems for which there are no available traces, we chose to replicate m100 M for 10 times to create m1 B with over 1 billion files and 70 M directories. While a similar scale-up approach has been used in the literature [27], [52], the duplication-filled system may exhibit different properties from a real system with 100 M or 1 B files. Note that other file systems have been used in the trace for testing the system 5 in a distributed environment.

Plan 9 File Systems embodiment: Plan 9 is a distributed file system developed and used at the Bell Labs [44], [45]. We replayed the trace data collected on two central file servers bootes and emelie, to obtain two file systems, pb (for bootes) and pe (for emelie), each of which has over 2 M files and 70-80 K directories.

NFS embodiment: Here we used the Harvard trace [22], [48] that consists of workloads on NFS servers. The replay of one day trace created about 1,500 directories and 20 K files. Again, we scaled up the one-day system to a larger file system nfs (2.3 M files and 137 K folders), using the abovementioned approach.

Synthetic File Systems embodiment: To conduct a more comprehensive set of experiments on file systems with different file and directory counts, we used Impressions [1] to generate a set of synthetic file systems. Impressions takes as input the distributions of file and directory counts and metadata attributes (e.g., number of files per directory, file size and timestamps), and randomly generates a file system image on disk. For metadata attributes, Impressions by default uses the empirical distributions identified by studies on the Microsoft traces [2]. By adjusting the file count and the (expected) number of files per directory, we used Impressions to generate three file systems, i10 K, i100 K, and i1 M (here 'i' stands for Impressions), with file counts 10 K, 100 K, and 1 M, and directory counts 1 K, 10 K, and 100 K, respectively.

Aggregate Queries

Figure 4:
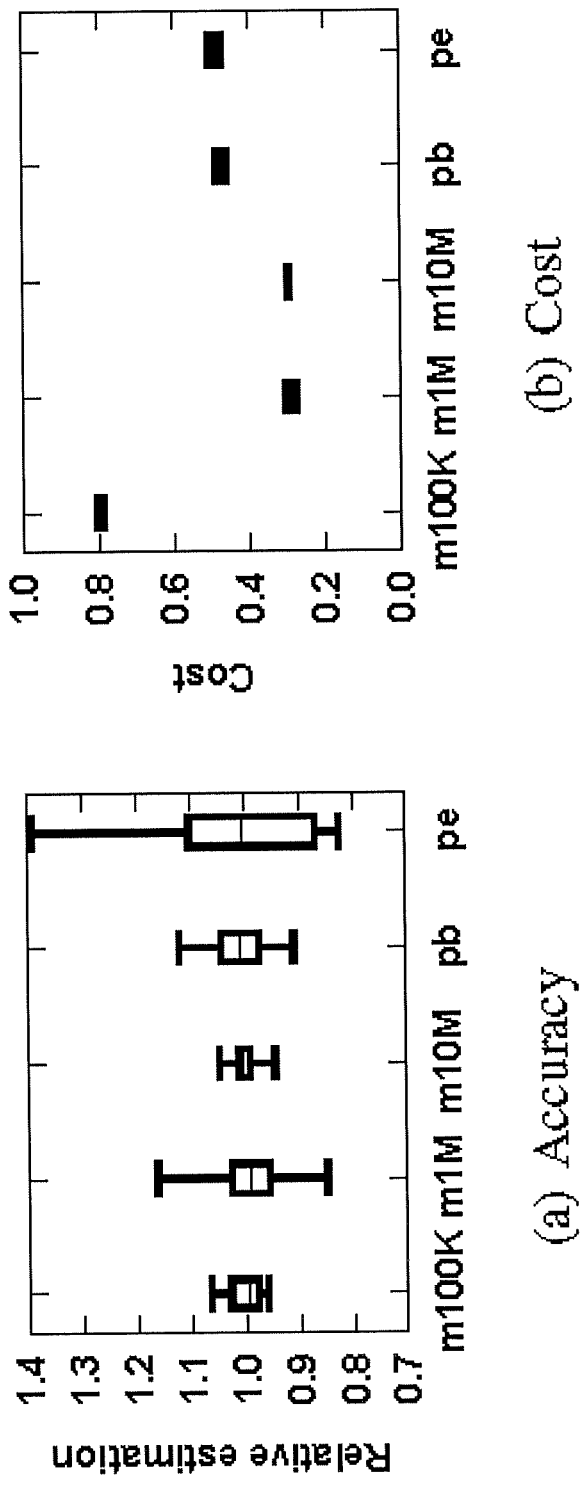
FIGS. 4(a), (b) are box plots of accuracy and cost.

We first considered Q1 discussed above, i.e., the total number of files in the system. To provide a more intuitive understanding of query accuracy (than the arguably abstract measure of relative error), we used the Matlab simulator (for quick simulation) to generate a box plot (FIG. 4) of estimations and overhead produced by the system 5 on Q1 over five file systems, m100 K to m10 M, pb and pe. In the figures, the central line of each box represents the median value, and the edges of the box stand for the 25th and 75th percentiles of the runs. As defined above, the query cost (in FIG. 4(b) and the following figures) is the ratio between the number of directories visited by the system and that by file-system crawling. As shown, the system 5 consistently generates accurate query answers, e.g., for m10 M, sampling 30% of directories produces an answer with 2% average error. While there are outliers, the number of outliers is small and their errors never exceed 7%.

Figure 5A:
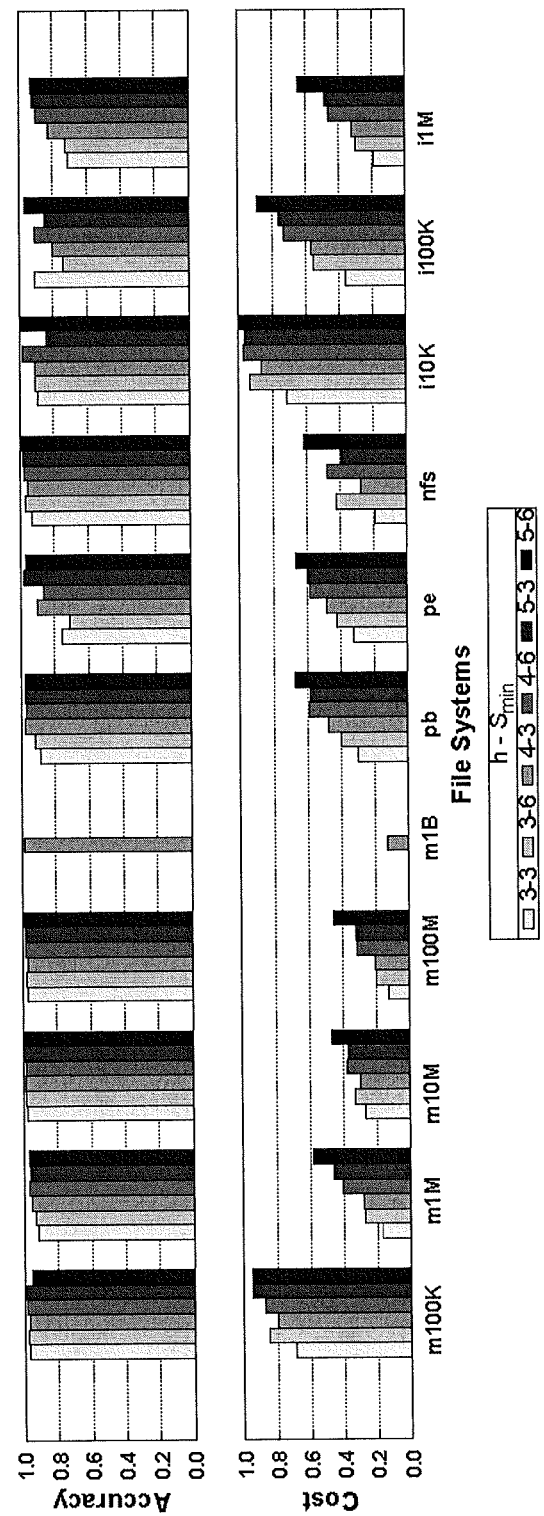
FIG. 5(a) shows accuracy and cost of aggregate queries under different settings of the input parameters (label 3-3 stands for h of 3 and $s_{min}$ of 3, 3-6 for h of 3 and $s_{min}$ of 6, etc., while $p_{set}$ is 50% for all cases.

We also evaluated the system 5 with other file systems and varied the input parameter settings. This test was conducted on the Linux and ext3 implementation, and so were the following tests on aggregate queries. In this test, we varied the minimum number of selections $s_{min}$ from 3 to 6, the number of crawled levels h from 3 to 5, and set the selection probability as $p_{sel}$=50% (i.e., half of the subfolders will be selected if the amount is more than $s_{min}$). FIG. 5(a) shows the query accuracy and cost on the eleven file system embodiments we implemented. For all file systems, the system 5 was able to produce very accurate answers (with <10% relative error) when crawling four or more levels (i.e., h≥4). Also note from FIG. 5(a) that the performance of the system 5 is less dependent on the type of the file system than its size—it achieves over 90% accuracy for NFS, Plan 9, and NTFS (m10 M to m1 B). Depending on the individual file systems, the cost ranges from less than 12% of crawling for large systems with 1 B files and 80% for the small 100 K system. The algorithm scales very well to large file systems e.g., m100 M and m1 B—the relative error is only 1-3% when the system 5 accesses only 10-20% of all directories. For m1 B, the combination of $p_{sel}$=50%, $s_{min}$=3 and h=4 produces 99% accuracy with very little cost (12%).

Figure 5B:
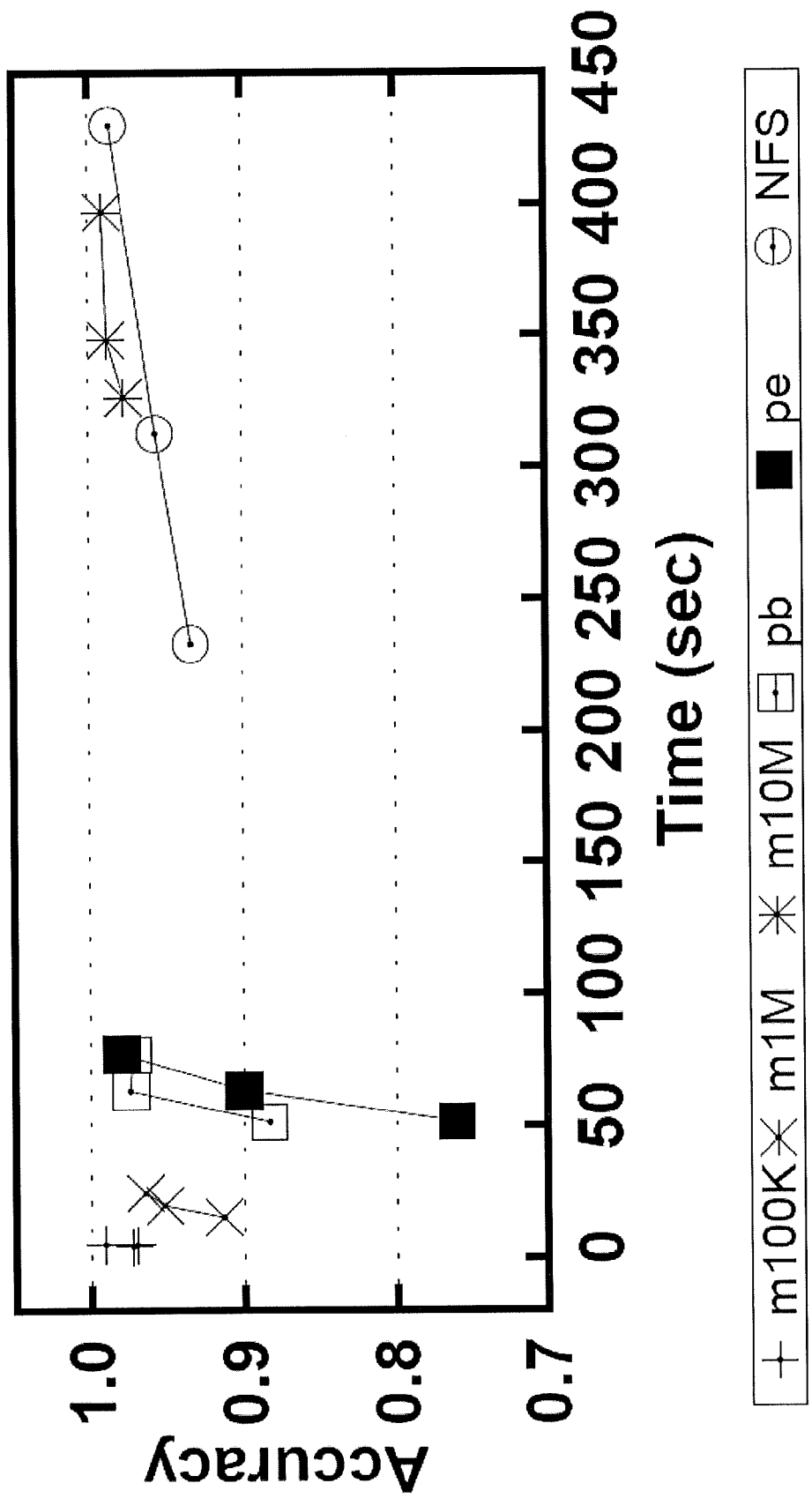
FIG. 5(b) shows query accuracy vs. runtime in seconds.

FIG. 5(b) shows query accuracy vs. runtime in seconds for aggregate queries. Three points of each line (from left to right) represent h of 3, 4, and 5, respectively. The absolute runtime depends heavily on the size of the file system, e.g., seconds for m100 K, several minutes for nfs (2.3 M files), and 1.2 hours for m100 M. Note that in this description we only used a single hard drive; parallel IO to multiple hard drives (e.g., RAID) will be able to utilize the aggregate bandwidth to further improve the performance. Further details are set forth in Just-In-Time Analytics on Large File Systems, H. Huang et al., Proceedings of the 9th USENIX conference on file and storage technologies (2011), which is incorporated herein by reference.

Figure 6:
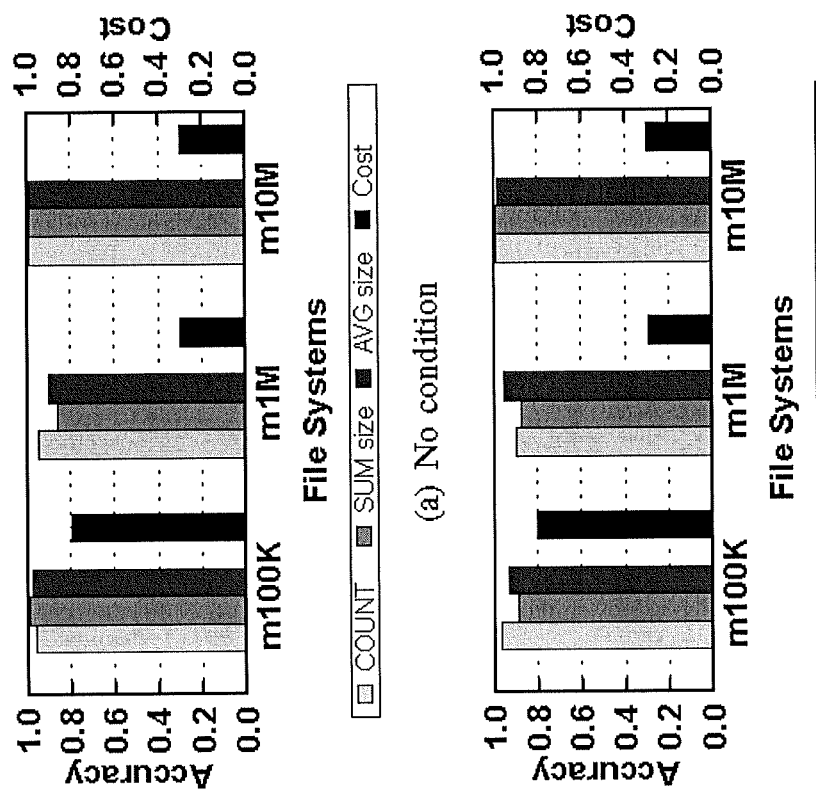
FIGS. 6(a), (b) are plots of accuracy and cost of queries.

We also considered other aggregate queries with various aggregate functions and with/without selection conditions, that is, Q2 and Q3 like queries as above. FIG. 6(a) presents the accuracy and cost of evaluating the SUM and AVG of file sizes for all files in the system, while FIG. 6(b) depicts the same for exe files. We included in both figures the accuracy of COUNT because AVG is calculated as SUM/COUNT. Both SUM and AVG queries receive very accurate answers, e.g., only 2% relative error for m10 M with or without the selection condition of '.exe'. The query costs are moderate for large systems—30% for m1 M and m10 M (higher for the small system m100 K). We also tested SUM and AVG queries with other selection conditions (e.g., file type='.dll') and found similar results.

Improvements Over FS_Agg_Basic

Figure 7:
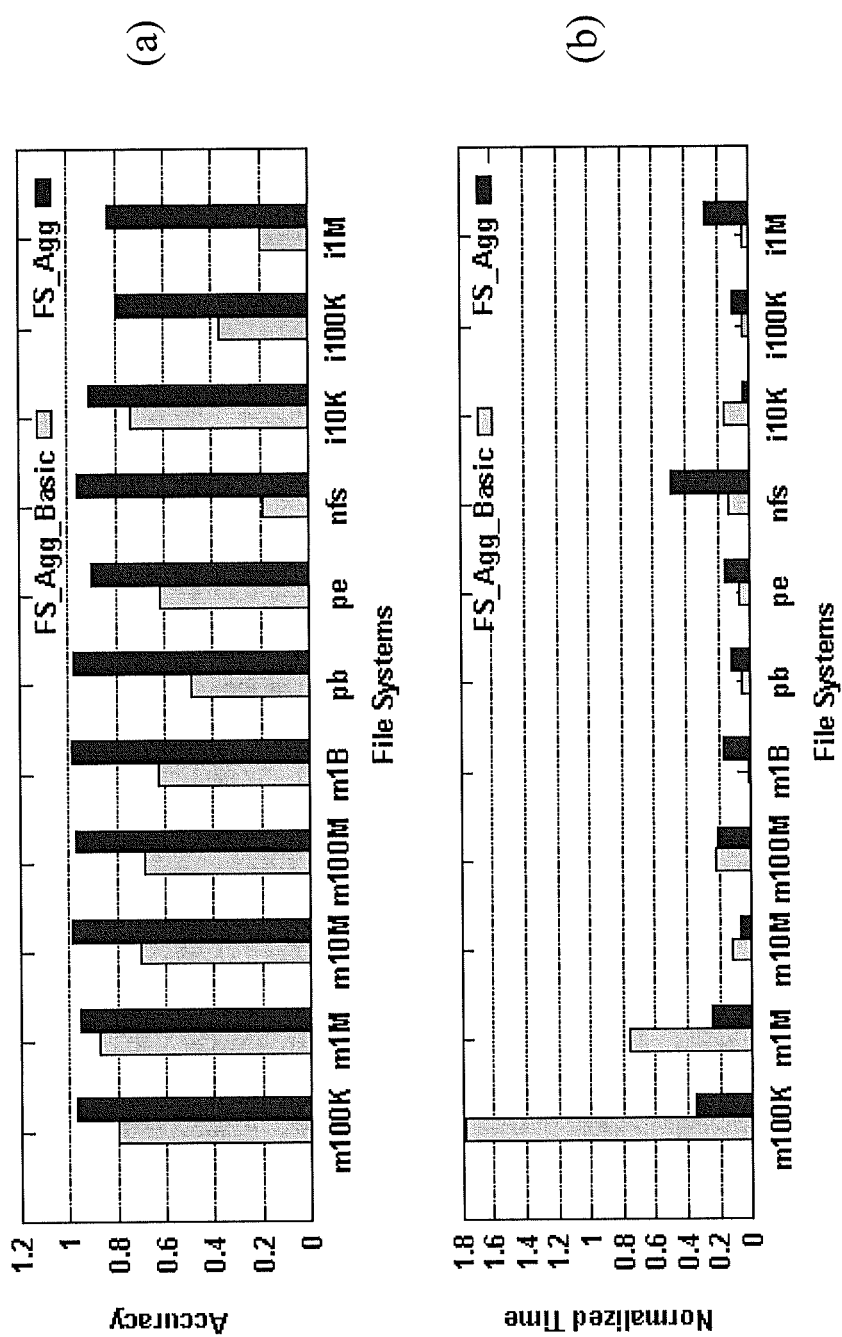
FIGS. 7(a), (b) are plots of query accuracy and time for Basic and FS_Agg.

To investigate the effectiveness of the two enhancements used in FS_Agg, we compared the accuracy and efficiency (in terms of runtime) of FS_Agg with FS_Agg Basic over Q1. FIGS. 7(a), (b) depict the result, with runtime normalized to that of the fired command in Linux. As shown, while both algorithms are much more efficient than find for almost all file systems, the improvement from FS_Agg_Basic to FS_Agg is also significant—e.g., for m100 M, the accuracy increases from 69% to 97% while the runtime decreases slightly. Note that while the runtime for FS_Agg is actually higher for i100 K and i1 M, this can be justified by more than 40% gains in terms of accuracy.

Distributed Aggregate Queries

Figure 8:
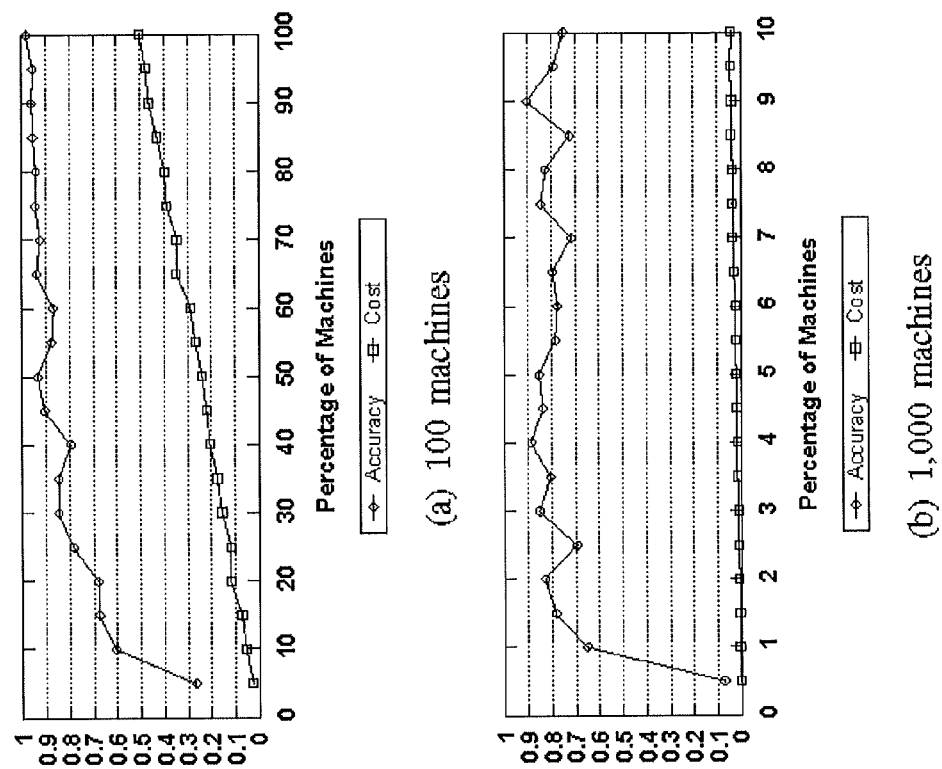
FIGS. 8(a), (b) are plots showing distributed queries.

To emulate a distributed environment, we tested FS_Agg over a combination of 100 or 1,000 file systems randomly selected from the Microsoft traces. Note that, to process aggregate queries over a distributed system, the present invention may only sample a small percentage of randomly selected machines to perform FS_Agg. To verify the effectiveness of this approach, we varied the selection percentage—i.e., the percentage of machines randomly selected to run FS_Agg—from 0% to 100% for the 100-machine system and from 0% to 10% for the 1,000-machine (i.e., local components 10) system. After running FS_Agg over all selected systems, we multiplied the average file count per machine with the total number of machines to produce the final query answer. FIGS. 8(a), (b) depict the accuracy and cost for counting the total number of files over both systems. For the 100-machine system, the query accuracy increases quickly to above 80% when sampling 30% of the machines and incurring a cost of 16% compared with crawling all machines. The accuracy is further improved to 98% when all machines are selected and a query cost of 50% is incurred. The performance is even better for the 1,000-machine system. In particular, 80% accuracy is achieved when 2% of all machines are selected—incurring a query cost of just 0.9%. The accuracy varies when sampling more machines, which is not surprising considering the large variations among all file systems.

Top-K Queries

Figure 9:
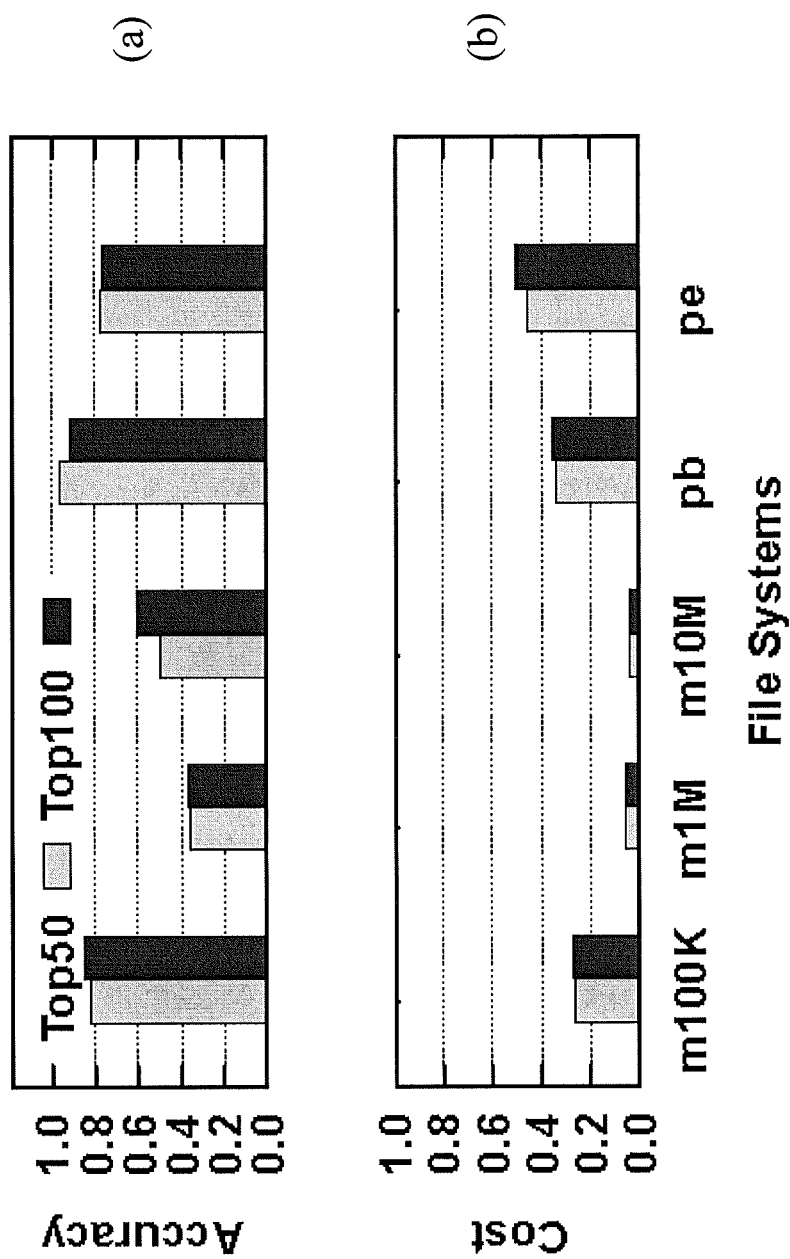
FIGS. 9(a), (b) are plots showing accuracy and cost of Top-k queries on file size.

To evaluate the performance of FS TopK, we considered both Q5 and Q6 discussed above. For Q5, i.e., the k largest files, we tested the present invention over five file system embodiments, with k being 50 or 100. As shown in FIGS. 9(a), (b), in all but one case (m1 M) the system 5 is capable of locating at least 50% of all top-k files (for pb, more than 95% are located). Meanwhile, the cost is as little as 4% of crawling (for m10 M). For these top-k queries, similar to aggregate queries, the runtime is correlated to the size of the file system—the queries take only a few seconds for small file systems, and up to ten minutes for large systems (e.g., m10 M). When we varied $\gamma$ from 1, 5, 10, to 100,000 in this test, we found that the query cost increases as $\gamma$ does. Fortunately, a moderate $\gamma$ of 5 and 10 presents a good tradeoff point—achieving a reasonable accuracy without incurring too much cost.

Another embodiment of the invention is to provide Q6, i.e., the k most recently modified files over m100 K, m1 M, and pb, and the system 5 is capable of locating more than 90% of top-k files for pb, and about 60% for m100 K and m1 M. The cost, meanwhile, is 28% of crawling for m100 K, 1% for m1 M, and 36% for pb. Further detail is provided in publication [28] below for details, which is incorporated herein by reference.

Related Work

Metadata query on file systems: Prior research on filesystem metadata query [27], [29], [35], [37] has extensively focused on databases, which utilize indexes on file metadata. However, the results [27], [34], [35] reviewed the inefficiency of this paradigm due to metadata locality and distribution skewness in large file systems. To solve this problem, Spyglass [33], [35], SmartStore [27], and Magellan [34] utilize multi-dimensional structures (e.g., K-D trees and R-trees) to build indexes upon subtree partitions or semantic groups. SmartStore attempts to reorganize the files based on their metadata semantics. Conversely, the present invention avoids any file-specific optimizations, aiming instead to maintain file system agnosticism. It works seamlessly with the tree structure of a file system and avoids the time and space overheads from building and maintaining the metadata indexes.

Comparison with Database Sampling: Traditionally database sampling has been used to reduce the cost of retrieving data from a DBMS. Random sampling mechanisms have been extensively studied [4], [6], [9], [12], [14], [16], [23], [38]. Applications of random sampling include estimation methodologies for histograms and approximate query processing (see tutorial in [16]). However, these techniques do not apply when there is no direct random access to all elements of interest—e.g., in a file system, where there is no complete list of all files/directories.

Another particularly relevant topic is the sampling of hidden web databases [8], [25], [26], [31], for which a random descent process has been used to construct queries issued over the web interfaces of these databases [17]-[20]. While both these techniques and the present invention use random descents, a unique challenge for sampling a file system is its much more complex distribution of files. If we consider a hidden database in the context of a file system, then all files (i.e., tuples) appear under folders with no subfolders. Thus, the complex distribution of files in a file system calls for a different sampling technique, as discussed in the paper [28], which is incorporated by reference.

Top-k Query Processing: Top-k query processing has been extensively studied over both databases (e.g., see a recent survey [30]) and file systems [3], [7], [27], [35]. For file systems, a popular application is to locate the top-k most frequent (or space-consuming) files/blocks for redundancy detection and removal. For example, Lillibridge et al. [36] proposed the construction of an in-memory sparse index to compare an incoming block against a few (most similar) previously stored blocks for duplicate detections (which can be understood as a top-k query with a scoring function of similarity). Top-k query processing has also been discussed in other index-building techniques, e.g., in Spyglass [35] and SmartStore [27].

Discussion

At present, the system 5 takes several pre-defined parameters as the inputs and needs to complete the execution in whole. That is, the system 5 is not an any-time algorithm and cannot be stopped in the middle of the execution, because our current approach relies on a complete sample to reduce query variance and achieve high accuracy. One limitation of this approach is that its runtime over an alien file system is unknown in advance, which can make it unsuitable for the applications with absolute time constraints. For example, a border patrol agent may need to count the amount of encrypted files in a traveler's hard drive, in order to determine whether the traveler could be transporting sensitive documents across the border [13], [47]. In this case, the agent must make a fast decision as the amount of time each traveler can be detained for is extremely limited. To address this, the system 5 can have a time-out knob that a user can use to decide the query time over a file system. The system 5 can also have algorithms that allow the system 5 to get smarter—be predictive about the run-time and self-adjust the work flow based on the real-time requirements.

The system 5 employs a "static" strategy over file systems and queries, i.e., it does not modify its techniques and traversals for a query. A dynamic approach is attractive because in that case the system 5 would be able to adjust the algorithms and parameters depending on the current query and file system. New sampling techniques, e.g., stratified and weighted sampling, shall be investigated to further improve query accuracy on large file systems. The semantic knowledge of a file system can also help in this approach. For example, most images can be found in a special directory, e.g. "/User/Pictures/" in MacOS X, or "\Documents and Settings\User\My Documents\My Pictures\" in Windows XP.

The system 5 can also leverage the results from the previous queries to significantly expedite the future ones, which is beneficial in situations when the workload is a set of queries that are executed very infrequently. The basic idea is to store the previous estimations over parts (e.g., subtrees) of the file system, and utilize the history module 16 to limit the search space to the previously unexplored part of the file system, unless it determines that the history is obsolete (e.g., according to a pre-defined validity period). Note that the history shall be continuously updated to include newly discovered directories and to update the existing estimations.

CONCLUSION

Just-in-time analytics over a large-scale file system is provided through its tree- or DAG-like structure. The system includes a random descent technique to produce unbiased estimations for SUM and COUNT queries and accurate estimations for other aggregate queries, and a pruning-based technique for the approximate processing of top-k queries. Two improvements include high-level crawling and breadth-first descent are effective over real-world file systems.

The present invention can also include security applications to handle ill-formed file systems that malicious users could potentially construct (though rarely exist in practice).

For example, the invention can incorporate a process to accurately answer aggregate queries if a large number of folders are hundreds of levels below root. Similarly, the invention can be modified to efficiently handle cases where all files have extremely close scores. This, however, is contradicted by the heavy-tailed distribution observed on most meta-data attributes in real-world file systems [2].

The following references, and those noted above, are each incorporated herein by reference: [1] AGRAWAL, N., ARPACI-DUSSEAU, A., AND ARPACI-DUSSEAU, R. Generating realistic impressions for file-system benchmarking. *ACM Transactions on Storage (TOS)* 5, 4 (2009), 1-30; [2] AGRAWAL, N., BOLOSKY, W., DOUCEUR, J. AND LORCH, J. A five-year study of file-system metadata. In *Proceedings of the 5th USENIX Conference on File and Storage Technologies* (2007), pp. 31-45; [3] AMES, S., GOKHALE, M., AND MALTZAHN, C. Design and implementation of a metadata-rich file system. Tech. Rep. UCSC-SOE-10-07, University of California, Santa Cruz, 2010; [4] BARBARA, D., DUMOUCHEL, W., FALOUTSOS, C, HAAS, P., HELLERSTEIN, J., IOANNIDIS, Y., JAGADISH, H., JOHNSON, T., NG, R., POOSALA, V., ET AL. The New Jersey data reduction report. *IEEE Data Eng. Bull.* 20, 4 (1997), 3-45; [5] BEAGLE, http://beagle-project.org/; [6] BETHEL, J. Sample allocation in multivariate surveys. *Survey methodology* 15, 1 (1989), 47-57; [7] BRANDT, S., MALTZAHN, C, POLYZOTIS, N., and TAN, W.-C. Fusing data management services with file systems. In *Proceedings of the 4th Annual Workshop on Petascale Data Storage (PDSW '09)* (New York, N.Y., USA, 2009), ACM, pp. 42-46; [8] CALLAN, J., AND CONNELL, M. Query-based sampling of text databases. *ACM Trans. Inf. Syst.* 19 (April 2001), 97-130; [9] CAUSEY, B. COMPUTATIONAL aspects of optimal allocation in multi-variate stratified sampling. *SIAM Journal on Scientific and Statistical Computing* 4 (1983), 322; [10] CHAUDHURI, S., DAS, G., AND NARASAYYA, V. Optimized stratisfied sampling for approximate query processing. *ACM Transactions on Database Systems (TODS)* 32, 2 (2007), 9; [11] CHAUDHURI, S., DAS, G., AND SRIVASTAVA, U. Effective use of block-level sampling in statistics estimation. In *Proceedings of the 2004 ACM SIGMOD international conference on Management of data* (2004), ACM, p. 298; [12] CHROMY, J. Design optimization with multiple objectives. In *Proceedings on the Research Methods of the American Statistical Association* (1987), pp. 194-199; [13] CNET. Security guide to customs-proofing your laptop. http://news.cnet.com/8301-13578_3-9892897-38.html (2009); [14] COCHRAN, W. Sampling technique. New York: John Willey & Sons (1977); [15] COCHRAN, W. *Sampling Techniques*. John Wiley & Sons, New York, 1977; [16] DAS, G. Survey of approximate query processing techniques (tutorial). In *International Conference on Scientific and Statistical Database Management (SSDBM '03)* (2003); [17] DASGUPTA, A., DAS, G., AND MANNILA, H. A random walk approach to sampling hidden databases. In *Proceedings of the 2007 ACM SIGMOD international conference on Management of data (SIGMOD '07)* (2007), pp. 629-640; [18] DASGUPTA, A., JIN, X., JEWELL, B., ZHANG, N., AND DAS, G. Unbiased estimation of size and other aggregates over hidden web databases. In *Proceedings of the 2010 international conference on Management of data (SIGMOD)* (2010), pp. 855-866; [19] DASGUPTA, A., ZHANG, N., AND DAS, G. Leveraging count information in sampling hidden databases. In *Proceedings of the 2009 IEEE International Conference on Data Engineering* (2009), pp. 329-340; [20] DASGUPTA, A., ZHANG, N., DAS, G., AND CHAUDHURI, S. Privacy preservation of aggregates in hidden databases: why and how? In *Proceedings of the 35th SIGMOD international conference on Management of data* (2009), pp. 153-164; [21] DAVID, H. A., AND NAGARAJA, H. N. *Order Statistics (3rd Edition)*. Wiley, New Jersey, 2003; [22] ELLARD, D., LEDLIE, J., MALKANI, P., AND SELTZER, M. Passive nfs tracing of email and research workloads. In *Proceedings of the 2nd USENIX Conference on File and Storage Technologies (FAST '03)* (Berkeley, Calif., USA, 2003), USENIX Association, pp. 203-216; [23] GAROFALAKIS, M. N., AND GIBBON, P. B. Approximate query processing: Taming the terabytes. In *Proceedings of the 27th International Conference on Very Large Data Bases (VLDB)* (2001); [24] GOGGLE. Google desktop. http://desktop.google.com/; [25] HEDLEY, Y. L., YOUNAS, M., JAMES, A., AND SANDERSON, M. A two-phase sampling technique for information extraction from hidden web databases. In *Proceedings of the 6th annual ACM international workshop on Web information and data management (WIDM '04)* (2004), pp. 1-8; [26] HEDLEY, Y.-L., YOUNAS, M., JAMES, A. E., AND SANDERSON, M. Sampling, information extraction and summarisation of hidden web databases. *Data and Knowledge Engineering* 59, 2 (2006), 213-230; [27] HUA, Y., JIANG, H., ZHU, Y, FENG, D., AND TIAN, L. SmartStore: a new metadata organization paradigm with semantic-awareness for next-generation file systems. In *Proceedings of the Conference on High Performance Computing Networking, Storage and Analysis (SC)* (2009), ACM, pp. 1-12; [28] HUANG, H. ZHANG, N., WANG, W., DAS, G., AND SZALAY, A. Just-in-time analytics on large file systems. In *Proceedings of the 9th USENIX conference on File and storage technologies* (2011), USENIX Association; [29] HUSTON, L., SUKTHANKAR, R., WICKREMESINGHE, R., SATYA-NARAYANAN, M., GANGER, G., RIEDEL, E., AND AILAMAKI, A. Diamond: A storage architecture for early discard in interactive search. In *Proceedings of the 2004 USENLX File and Storage Technologies FAST Conference* (2004); [30] ILYAS, I. F., BESKALES, G., AND SOLIMAN, M. A. A survey of top-k query processing techniques in relational database systems. *ACM Computing Surveys* 40, 4 (2008), 1-58; [31] IPEIROTIS, P. G., AND GRAVANO, L. Distributed search over the hidden web: hierarchical database sampling and selection. In *Proceedings of the 28th international conference on Very Large Data Bases (VLDB '02)* (2002), pp. 394-405; [32] KOGGE, P., BERGMAN, K., BORKAR, S., CAMPBELL, D., CARLSON, W., DALLY, W., DENNEAU, M., FRANZON, P., HARROD, W., HILL, K., ET AL. Exascale computing study: technology challenges in achieving exascale systems. *DARPA Information Processing Techniques Office* 28 (2008); [33] LEUNG, A. Organizing, indexing, and searching large-scale file systems. Tech. Rep. UCSC-SSRC-09-09, University of California, Santa Cruz, December 2009; [34] LEUNG, A., ADAMS, I., AND MILLER, E. Magellan: a searchable metadata architecture for large-scale file systems. Tech. Rep. UCSC-SSRC-09-07, University of California, Santa Cruz, November 2009; [35] LEUNG, A. W., SHAO, M., BISSON, T., PASUPATHY, S., AND MILLER, E. L. Spyglass: fast, scalable metadata search for large-scale storage systems. In *Proceedings of the 7th conference on File and Storage Technologies (FAST)* (Berkeley, Calif., USA, 2009), USENIX Association, pp. 153-166; [36] LILLIBRIDGE, M., ESHGHI, K., BHAGWAT, D., DEOLALIKAR, V., TREZISE, G., AND CAMBLE, P. Sparse indexing: large scale, inline deduplication using sampling and locality. In *Proceedings of the 7th conference on File and Storage Technologies (FAST)* (Berkeley, Calif., USA, 2009), USENIX Association, pp. 111-123; [37] LIU, L., XU, L., WU, Y., YANG, G., AND GANGER, G. Smartscan: Efficient metadata crawl for storage management metadata querying in large file systems. *Carnegie Mellon University Parallel Data Lab Technical Report CMU-PDL-10-112* (2010); [38] LOHR, S. Sampling: design and analysis. *Pacific Grove* (1999); [39] MURPHY, N., TONKELOWITZ, M., AND VERNAL, M. The design and implementation of the database file system. http://citeseerx.ist.psu.edu/viewdoc/summary?doi=10.1.1.11.8068; [40] NUNEZ, J. High end computing file system and IO R&D gaps roadmap. *HEC FSIO R&D Conference* (August 2008); [41] OLKEN, F., AND ROTEM, D. Simple random sampling from relational databases. In *Proceedings of the 12th International Conference on Very Large Data Bases* (1986), pp. 160-169; [42] OLKEN, F., AND ROTEM, D. Random sampling from database files: a survey. In *Proceedings of the fifth international conference on Statistical and scientific database management* (1990), Springer-Verlag New York, Inc., pp. 92-111; [43] OLSON, M. The design and implementation of the Inversion file system. In *Proceedings of the Winter* 1993 *USENIX Technical Conference* (1993), pp. 205-217; [44] PIKE, R., PRESOTTO, D., DORWARD, S., FLANDRENA, B., THOMPSON, K., TRICKEY, H., AND WINTERBOTTOM, P. Plan 9 from bell labs. *Computing systems* 8, 3 (1995), 221-254; [45] PLAN 9 FILE SYSTEM TRACES, http://pdos.csail.mit.edu/p9trace/; [46] SELTZER, M., AND MURPHY, N. Hierarchical file systems are dead. In *Proceedings of the 12th conference on Hot topics in Operating Systems (HotOS '09)* (2009), pp. 1-1; [47] SLASHDOT. Laptops can be searched at the border. http://yro.slashdot.org/article.pl?sid=08/04/22/1733251 (2008); [48] SNIA. NFS traces. http://iotta.snia.org/traces/list/NFS (2010); [49] STAHLBERG, P., MIKLAU, G., AND LEVINE, B. N. Threats to privacy in the forensic analysis of database systems. In *Proceedings of the* 2007 *ACM SIGMOD international conference on Management of data (SIGMOD '07)* (New York, N.Y., USA, 2007), ACM, pp. 91-102; [50] SZALAY, A. New challenges in petascale scientific databases. In *Proceedings of the 20th international conference on Scientific and Statistical Database Management (SSDBM '08)* (Berlin, Heidelberg, 2008), Springer-Verlag, pp. 1-1; [51] VITTER, J. Random sampling with a reservoir. *ACM Transactions on Mathematical Software (TOMS)* 11, 1 (1985), 57; and [52] ZHU, Y., JIANG, H., WANG, J., AND XIAN, F. HBA: Distributed Metadata Management for Large Cluster-Based Storage Systems. *IEEE Transactions on Parallel and Distributed Systems* 19 (2008), 750-763.

The description and drawings of the present invention provided in the description should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A computer-readable non-transitory medium having instructions for performing a query of a multi-level file system having a total number of folders, wherein the instructions are capable of being executed by a processor that is in communication with the file system to perform steps comprising the steps of:
    (a) determining by the processor querying a root level of the file system, a number of folders and a number of files at the root level of the multi-level file system, in which the number of levels is unknown and each level has at least one file or folder and at least one level has a plurality of folders and the multi-level file system can have one or more files at any level;
    (b) arbitrarily selecting by the processor, one of the root level folders to be a currently-selected folder;
    (c) determining by the processor querying the currently-selected folder, a number of sub-folders and a number of files contained in the currently-selected folder;
    (d) arbitrarily selecting by the processor, one of the sub-folders in the currently-selected folder to be the currently-selected folder;
    (e) repeating steps (c) and (d) until the currently-selected folder contains no further sub-folders, whereby steps (b)-(e) are performed for fewer than the total number of folders to thereby achieve approximate processing of aggregate and top-k queries over the file system; and
    (f) calculating by the processor, an estimate of a total number of files in the multi-level file system based on the determinations at steps (a) and (c), wherein the non-transitory medium does not refer to a New Technology File System with a master file table, and
    whereby steps (c), (d) and (e) drills down a single path of folders and sub-folders, and further comprising repeating steps (a)-(e) for a different root level folder to drill down a different single path of folders and sub-folders.

2. The non-transitory medium of claim 1, wherein the processor includes a sampler module, and steps (a) and (c) are determined by the sampler.

3. The non-transitory medium of claim 1, wherein the processor includes a calculator module, and step (f) is calculated by the calculator.

4. The non-transitory medium of claim 1, wherein the step of arbitrarily selecting is unbiased.

5. The non-transitory medium of claim 1, wherein the aggregate query comprise an FS_Agg algorithm and the top-k query comprises an FS-TopK algorithm.

6. The non-transitory medium of claim 1, wherein the file system comprises FAT32, ext2, or ext3.

7. A computer-readable non-transitory medium having instructions for performing a query of a file system having multiple levels of total folders and files contained within one or more of those folders, wherein the instructions are capable of being executed by a processor that is in communication with the file system to perform steps comprising the steps of:
    selecting by the processor, a folder at each level of at least a portion of the multiple levels of the file system until the selected folder contains no further folders, whereby each selected folder is contained within the immediate previously-selected folder, wherein in the file system the number of the multiple levels is unknown and each level has at least one file or folder and at least one level has a plurality of folders and the file system can have one or more files at any level;
    determining by the processor, a number of folders and a number of files contained in each of the selected folders, whereby the selected folders are fewer than the total folders to thereby achieve approximate processing of aggregate and top-k queries over the file system; and
    calculating by the processor, an estimate of a number of total files in the file system based on the step of determining,
    wherein the non-transitory medium does not refer to a master file table of a new technology file system, and
    whereby the steps selecting, determining and calculating drills down a single path of folders and sub-folders, and further comprising repeating the steps of selecting, determining and calculating for a different root level folder to drill down a different single path of folders and sub-folders.

8. The non-transitory medium of claim 7, wherein the step of selecting comprises arbitrarily selecting a single folder from amongst all folders at a given level.

9. The non-transitory medium of claim 7, further comprising selecting, determining and calculating to obtain a second estimate of number of total files in the file system, and determining an average of the estimate of number of total files and the second estimate of number of total files.

10. The non-transitory medium of claim 7, wherein only a single folder is selected at each level of the at least a portion of the multiple levels.

11. The non-transitory medium of claim 7, wherein a single folder is selected at every level of the multiple levels.

12. The non-transitory medium of claim 7, wherein the calculating an estimate is performed as each folder is selected.

13. The non-transitory medium of claim 7, wherein the number of folders and files contained in each of the selected folders comprises a first count, and further comprising:
　calculating a second count by accessing all folders at one or more top levels of the file system;
　dividing the first count by a total number of files on the file system below the one or more top level to obtain a first value;
　dividing the second count by a total number of the one or more top levels of the file system to obtain a second value; and
　aggregating the first value and the second value.

14. The non-transitory medium of claim 13, wherein the second count is calculated by following all subfolder branches of folders accessed at or below the highest level.

15. The non-transitory medium of claim 13, wherein the top levels is defined by a user.

16. The non-transitory medium of claim 13, wherein the aggregating can be based on selected criteria.

17. The non-transitory medium of claim 16, wherein the selected criteria comprises file extension type.

18. The non-transitory medium of claim 7, wherein the step of selecting comprises a drill-down process, and further comprising:
　generating an approximate lower bound for a k-th highest score for the files contained in the selected folders;
　generating an approximate upper bound for each subtree entered during the drill-down process based on a highest score of every file in each subtree;
　removing a subtree from the query if the highest score of every file in that subtree is less than the approximate lower bound for the k-th highest score; and
　accessing every folder in each subtree that was not removed from the query to locate top-k results for the query.

19. The non-transitory medium of claim 18, wherein the approximate upper bound for each subtree is estimated by applying order statistics to the files retrieved with the drill-down process.

20. The non-transitory medium of claim 18, wherein the approximate lower bound for the k-th highest score is estimated by applying order statistics to the files retrieved with the drill-down process.

21. The non-transitory medium of claim 7, wherein the file system is stored at a storage device and the processor is in communication with the storage device.

22. A system for performing an aggregate query of a multi-level file system having a total number of files, said system comprising:
　a processor in communication with the file system, the processor calculating a first count to estimate the total number of files in the file system using a drill-down process that counts fewer than the total number of files in the file system, calculating a second count by accessing all folders at one or more highest levels of the file system, dividing the first count by a total number of files on the file system each level below the highest level to obtain a first value, dividing the second count by a total number of highest levels of the file system to obtain a second value, and aggregating the first value and the second value to thereby achieve approximate processing of aggregate and top-k queries over the file system, wherein said processor does not refer to a master file table of a new technology file system, and wherein said processor drills down a single path of folders and sub-folders and repeats the drill down for a different single path of folders and sub-folders, and wherein in the multi-level file system the number of levels is unknown and each level has at least one file or folder and the multi-level file system can have one or more files at any level.

\* \* \* \* \*